United States Patent
Mestery et al.

(10) Patent No.: US 12,236,229 B2
(45) Date of Patent: Feb. 25, 2025

(54) IDENTIFYING EXECUTION ENVIRONMENTS FOR DEPLOYING NETWORK FUNCTIONS

(71) Applicant: Cisco Technology, Inc., San Jose, CA (US)

(72) Inventors: Kyle Andrew Donald Mestery, Woodbury, MN (US); Ian James Wells, San Jose, CA (US); Grzegorz Boguslaw Duraj, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/114,708

(22) Filed: Feb. 27, 2023

(65) Prior Publication Data
US 2023/0221946 A1    Jul. 13, 2023

Related U.S. Application Data

(63) Continuation of application No. 17/028,715, filed on Sep. 22, 2020, now Pat. No. 11,625,230.

(51) Int. Cl.
*G06F 9/44*    (2018.01)
*G06F 8/65*    (2018.01)
*H04L 67/52*   (2022.01)

(52) U.S. Cl.
CPC ............ *G06F 8/65* (2013.01); *H04L 67/52* (2022.05)

(58) Field of Classification Search
CPC .................................................. G06F 8/65
(Continued)

(56) References Cited

U.S. PATENT DOCUMENTS 6,898,183 B1    5/2005  Garakani
7,171,487 B2    1/2007  Herkersdorf et al.
(Continued)

FOREIGN PATENT DOCUMENTS

CN        107124306 A  *  9/2017   ......... G06F 9/45558
WO     WO2018177434      10/2018
WO     WO2020096639 A1    5/2020

OTHER PUBLICATIONS

Aditya Paarijaat et al: "Will Serverless Computing Revolutionize NFV?", Proceedings of the IEEE, IEEE. New York, us, vol. 107, No. 4, Apr. 1, 2019 (Apr. 1, 2019), pp. 667-678, XP011716841, ISSN: 0018-9219, DOI: 10.1109/JPROC.2019.2898101 [retrieved on Mar. 26, 2019] section IV.B.

(Continued)

*Primary Examiner* — Evral E Bodden
(74) *Attorney, Agent, or Firm* — Lee & Hayes, P.C.

(57) ABSTRACT

This disclosure describes techniques and mechanisms for using a domain-specific language (DSL) to express and compile serverless network functions, and optimizing the deployment location for the serverless network functions on network devices. In some examples, the serverless network functions may be expressed entirely in the DSL (e.g., via a text-based editor, a graphics-based editor, etc.), where the DSL is a computer language specialized to a particular domain, such as a network function domain. In additional examples, the serverless network functions may be expressed and compiled using a DSL in combination with a general-purpose language (GSL). Once the serverless network function have been expressed and/or compiled, the techniques of this disclosure further include determining an optimized network component on which the serverless network function is to execute, and deploying the serverless function to the optimized network component.

20 Claims, 13 Drawing Sheets

(58) Field of Classification Search
USPC .......................................................... 717/172
See application file for complete search history.

(56) References Cited

U.S. PATENT DOCUMENTS

| | | | |
|---|---|---|---|
| 7,765,539 | B1 | 7/2010 | Elliott et al. |
| 8,891,375 | B2* | 11/2014 | Wang ................ G06F 9/45558 |
| | | | 370/254 |
| 9,336,030 | B1* | 5/2016 | Marr .................... G06F 9/5077 |
| 9,436,443 | B2* | 9/2016 | Chiosi ................ H04L 41/5048 |
| 9,734,036 | B2* | 8/2017 | Baughman ............ H04L 41/083 |
| 9,910,411 | B2* | 3/2018 | Celik .................... G05B 15/02 |
| 10,303,456 | B2* | 5/2019 | Hunt ...................... H04W 4/70 |
| 10,326,532 | B2 | 6/2019 | Ashrafi |
| 10,542,076 | B2 | 1/2020 | Lee |
| 10,642,648 | B2 | 5/2020 | Ling et al. |
| 10,666,516 | B2 | 5/2020 | Jayaraman et al. |
| 10,756,995 | B2 | 8/2020 | Schibler et al. |
| 10,782,934 | B1* | 9/2020 | Chawda .................... G06F 8/30 |
| 10,805,215 | B2 | 10/2020 | Nainar et al. |
| 10,996,936 | B2 | 5/2021 | Gopal |
| 11,025,528 | B1 | 6/2021 | Rothschild et al. |
| 11,025,545 | B2 | 6/2021 | Enguehard et al. |
| 11,089,111 | B2 | 8/2021 | Markuze et al. |
| 11,115,385 | B1 | 9/2021 | Patel et al. |
| 11,126,415 | B1 | 9/2021 | Mestery et al. |
| 11,153,611 | B2 | 10/2021 | Wellbrock et al. |
| 2002/0161907 | A1 | 10/2002 | Moon |
| 2003/0033519 | A1 | 2/2003 | Buckman et al. |
| 2004/0062246 | A1 | 4/2004 | Boucher et al. |
| 2005/0089038 | A1 | 4/2005 | Sugai et al. |
| 2007/0061266 | A1 | 3/2007 | Moore et al. |
| 2011/0142056 | A1 | 6/2011 | Manoj |
| 2011/0153727 | A1 | 6/2011 | Li |
| 2013/0226764 | A1 | 8/2013 | Battyani |
| 2013/0227116 | A1 | 8/2013 | Radhakrishnan |
| 2014/0269329 | A1 | 9/2014 | Hooda et al. |
| 2014/0293928 | A1 | 10/2014 | Boldyrev et al. |
| 2015/0358248 | A1* | 12/2015 | Saha ...................... H04L 41/40 |
| | | | 709/226 |
| 2016/0274872 | A1 | 9/2016 | Narayanan et al. |
| 2016/0285722 | A1 | 9/2016 | Min et al. |
| 2016/0300006 | A1 | 10/2016 | Hathaway et al. |
| 2017/0126549 | A1 | 5/2017 | Paramasivam |
| 2017/0180209 | A1 | 6/2017 | Shevenell |
| 2017/0249130 | A1 | 8/2017 | Smiljanic et al. |
| 2017/0315791 | A1 | 11/2017 | Mascaro et al. |
| 2017/0344757 | A1 | 11/2017 | Clarke |
| 2018/0176088 | A1* | 6/2018 | Ellappan ............ G06F 9/45558 |
| 2018/0206187 | A1 | 7/2018 | Savolainen et al. |
| 2018/0217823 | A1 | 8/2018 | Marshall et al. |
| 2018/0302277 | A1 | 10/2018 | Shimamura et al. |
| 2018/0322136 | A1 | 11/2018 | Carpentier et al. |
| 2018/0351652 | A1 | 12/2018 | Ashrafi |
| 2018/0373516 | A1 | 12/2018 | Gopal |
| 2019/0052542 | A1 | 2/2019 | Passante et al. |
| 2019/0149480 | A1 | 5/2019 | Singhvi et al. |
| 2019/0182128 | A1 | 6/2019 | Shimamura et al. |
| 2019/0303018 | A1 | 10/2019 | Huang et al. |
| 2019/0310834 | A1 | 10/2019 | Smiljanic et al. |
| 2019/0317740 | A1 | 10/2019 | Herr et al. |
| 2019/0394812 | A1* | 12/2019 | Kuo ........................ H04W 4/02 |
| 2020/0059515 | A1 | 2/2020 | Kulkarni et al. |
| 2020/0104296 | A1 | 4/2020 | Hunn et al. |
| 2020/0259736 | A1 | 8/2020 | She et al. |
| 2020/0371755 | A1 | 11/2020 | Patni et al. |
| 2020/0380374 | A1 | 12/2020 | Foret et al. |
| 2020/0387364 | A1 | 12/2020 | O'Connell et al. |
| 2020/0389472 | A1 | 12/2020 | Drapeau et al. |
| 2021/0004209 | A1 | 1/2021 | Holt |
| 2021/0136105 | A1 | 5/2021 | McCarter |
| 2021/0352002 | A1 | 11/2021 | Knode |
| 2021/0360426 | A1 | 11/2021 | Kumar et al. |
| 2022/0091823 | A1 | 3/2022 | Wells et al. |
| 2022/0091836 | A1 | 3/2022 | Mestery et al. |

OTHER PUBLICATIONS

Andres et al., Transpiler-Based Architecture for Multi-platform Web Applications, published 2017, 6 pages.

Baresi, "Towards a Serverless Platform for Edge Computing", 2019, 11 pgs.

Brown, et al., "A Heterogeneous Parallel Framework for Domain-Specific Languages", 2011 International Conference on Parallel Architectures and Compilation Techniques, 2011, 12 pgs.

Chaber et al., "Auto-generation of advanced control algorithms' code for microcontrollers using transcompiler", Institute of Control and Computation Engineering, 2016, 6 pages.

Choit, et al., "Lambda-NIC Interactive Serverless Compute on Programmable SmartNICs", arXiv.org, published Sep. 26, 2019, 15 pages.

Datta, et al., "Valve: Securing Function Workflows on Serverless Computing Platforms", Apr. 2020, pp. 939-950.

Feng et al., "Exploring serverless computing for neural network training", source IEEE, published 2018.

Fox, et al., "Status of serverless computing and function-as-a-service (faas) in industry and research", published Jun. 5, 2017, 22 pgs.

Gerasimov, "The DSL for composing functions for FaaS platform", Semanticscholar, published 2019, 7 pages.

Hellerstein et al., "Serverless Computing: One Step Forward, Two Steps Back", CIDR'19, Jan. 2019, 8 pgs.

Jangda, et al., "Formal Foundations of Serverless Computing", Proc. ACM Program. Lang., vol. 3, No. OOPSLA, Article 149. Publication date: Oct. 2019, 44 pages.

Kimura et al, "A JavaScript Transpiler for Escaping from Complicated Usage of Cloud Services and APIs." 2018, 10 pages.

Linguaglossa, et al., "Survey of Performance Acceleration Techniques for Network Function Virtualization", 2019, 19 pgs.

Lopes Felipe A et al: "A Software Engineering Perspective on SDN Programmability,", A A IEEE Communications Surveys & Tutorials, vol. 18, No. 2, Apr. 1, 2016 (Apr. 1, 2016), pp. 1255-1272, XP011611155, DOI : 10.1109/COMST.2015.2501026 [retrieved on May 20, 2016] p. 1259 section III. C, p. 1260 section IV, p. 1263-1265 section V.A.

Lopez, et al., "Triggerflow: Trigger-based Orchestration of Serverless Workflows", DEBS '20, Jul. 2020, 12 pgs.

Office Action for U.S. Appl. No. 17/028,566, mailed on Mar. 18, 2021, Mestery, "Combining Domain-Specific Language with General-Purpose Language for Serverless Network Functions". 13 Pages.

Office Action for U.S. Appl. No. 17/028,646, mailed on Apr. 13, 2021, Wells, "Domain-Specific Language for Serverless Network Functions", 12 Pages.

Office Action for U.S. Appl. No. 17/028,646, mailed on Sep. 13, 2021, Wells, "Domain-Specific Language for Serverless Network Functions", 12 Pages.

Office Action for U.S. Appl. No. 17/028,646, mailed on Jan. 21, 2022, Wells, "Domain-Specific Language for Serverless Network Functions", 14 Pages.

Office Action for U.S. Appl. No. 17/028,715, mailed on Nov. 30, 2121, Mestery, "Identifying Execution Environments for Deploying Network Functions", 31 pages.

Office Action for U.S. Appl. No. 17/028,715, mailed Feb. 18, 22, Mestery, "Identifying Execution Environments for Deploying Network Functions", 37 pages.

Office Action for U.S. Appl. No. 17/028,646, mailed on Jun. 29, 2021, Wells, "Domain-Specific Language for Serverless Network Functions", 12 pages.

Office Action for U.S. Appl. No. 17/028,715, mailed Jul. 14, 2022, Mestery, "Identifying Execution Environments for Deploying Network Functions", 40 pages.

Office Action for U.S. Appl. No. 17/028,715, mailed on Aug. 4, 2021, Mestery, "Identifying Execution Environments for Deploying Network Functions" 229 pages.

Office Action for U.S. Appl. No. 17/028,715, mailed on Sep. 14, 2022, Mestery, "Identifying Execution Environments for Deploying Network Functions", 18 pages.

The International Search Report and Written Opinion for PCT Application No. PCT/US21/50619, mailed Nov. 26, 2021, 78 Pages.

(56) References Cited

OTHER PUBLICATIONS

The International Search Report and Written Opinion for PCT Application No. PCT/US21/50605, mailed Dec. 22, 2021.
The International Search Report and Written Opinion for PCT Application No. PCT/US21/50599, mailed Dec. 22, 2021.
Roberts, "Serverless Architectures", Martinfowler.com, published May 22, 2018, 50 pages.
Scheuner Joel et al: "Transpiling Applications into Optimized Serverless Orchestrations", 2019 IEEE 4th International Workshops on Foundations and Applications of Self* Systems (Fas*W), IEEE, Jun. 16, 2019 (Jun. 16, 2019), pp. 72-73, XP033593061, DOI: 10 . 1109/FAS-W.2019.00031 [retrieved on Aug. 7, 2019] section II.
Sujeeth, et al., "Delite: A Compiler Architecture for Performance-Oriented Embedded Domain-Specific Languages", 2014, 17 pgs.
Thibault, et al., "Static and Dynamic Program Compilation by Interpreter Specialization", Higher-Order and Symbolic Computation, 2000, pp. 161-178.
Examination Report for Indian Application No. 202347020942, Dated Apr. 25, 2024, 8 pages.
Examination Report for Indian Application No. 202347024260, Dated May 10, 2024, 8 pages.

\* cited by examiner

IDENTIFYING EXECUTION ENVIRONMENTS FOR DEPLOYING NETWORK FUNCTIONS

RELATED APPLICATIONS

This application claims priority to and is a continuation of U.S. patent application Ser. No. 17/028,715, filed on Sep. 22, 2020, now known as U.S. Pat. No. 11,625,230, issued on Apr. 11, 2023, the entire contents of which are incorporated herein by reference.

TECHNICAL FIELD

The present disclosure relates generally to using a domain-specific language to express and compile serverless network functions, and optimizing the deployment location for the serverless network functions on network devices.

BACKGROUND

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of network architectures, such as Local-Area Networks (LANs) that are in one physical location such as a building, Wide-Area Networks (WANs) that extend over a large geographic area to connect individual users or LANs, Enterprise Networks that are built for a large organization, Internet Service Provider (ISP) Networks that operate WANs to provide connectivity to individual users or enterprises, and so forth.

These networks often include specialized network devices to communicate packets representing various data from device-to-device, such as switches, routers, servers, access points, and so forth. Each of these devices is designed and configured to perform different networking functions. For instance, switches acts as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

Computing networks have continued to become more complex, such as with the introduction of software-defined networks (SDNs). In SDNs, the management of networks is centralized at a controller such that the control plane is abstracted from the data forwarding functions in the discrete networking devices. The SDN controller is the core element of an SDN architecture and enables centralized management and control, automation, and policy enforcement across physical and virtual network environments. Various standards or protocols have been developed for SDN architectures, such as OpenFlow, Programming Protocol-independent Packet Processors (P4), open virtual switch database (OVSDB), Python, and so forth. These SDN protocols allows the SDN controller to directly interact with the forwarding plane of network devices (such as switches and routers) using, for example, various application programming interfaces (APIs).

Traditionally, SDN controllers would use these SDN protocols in order to program network devices or push down changes to the switch/router flow-table, thereby allowing the SDN controller to partition traffic, control flows for optimal performance, test new configurations and applications, and/or otherwise control or steer data plane traffic. To perform the various operations, network devices have traditionally run the different types of network functions (e.g., packet drop functions, packet duplicate functions, packet forward functions, etc.) directly on hardware of the network devices (e.g., bare metal implementation). However, it can be inefficient, insecure, or otherwise disadvantageous to run various types of network functions on a same network device. For instance, due to the different types of networking functions that network devices are required to execute, the scale, diversity, and cost of hardware needed to efficiently run these network functions is greatly increased. Additionally, as needs of the network change, it may be necessary to update software running in the network, which can require replacement or update of the hardware in the network (e.g., replacing entire network devices or components in the devices).

In light of various inefficiencies and disadvantages of running network functions directly on hardware of network devices, network functions virtualization (NFV) technologies have emerged in order to separate network functions from underlying hardware to create a virtualized network that can run on commodity hardware, allowing networks to be more flexible and cost-effective. NFV technologies use virtual network functions (VNFs) that handle specific network functions, such as firewall functions, load balancing functions, packet-routing functions, and so forth. Thus, there has been a shift in networking from using several pieces of hardware, each performing a single function, to having several virtual machines (VMs) within a single piece of hardware where each VM is performing the actions of one or more VNFs. Even further, recent advances have included using containers for network function virtualization. That is, rather than simply using multiple VMs that act as a hardware virtualization, containers act as an operating system (OS) virtualization. The containers are able to share the same host OS of a VM, but may be able to run individual VNFs in an isolated manner such that each VM may support multiple containerized VNFs. However, various inefficiencies and disadvantages still exist when running VNFs in VMs and containers.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 1 further illustrates a network controller in a network architecture deploying the serverless network function at an optimal location (e.g., on an optimal network component or device) in the network architecture.

FIG. 7A illustrates expressing a serverless network function using the domain-specific language as well as at least one of a Go programming language or a Rust programming language, and FIG. 7B illustrates expressing a serverless network function using the domain-specific language as well as a Python programming language.

DESCRIPTION OF EXAMPLE EMBODIMENTS

Overview

Figure 1:
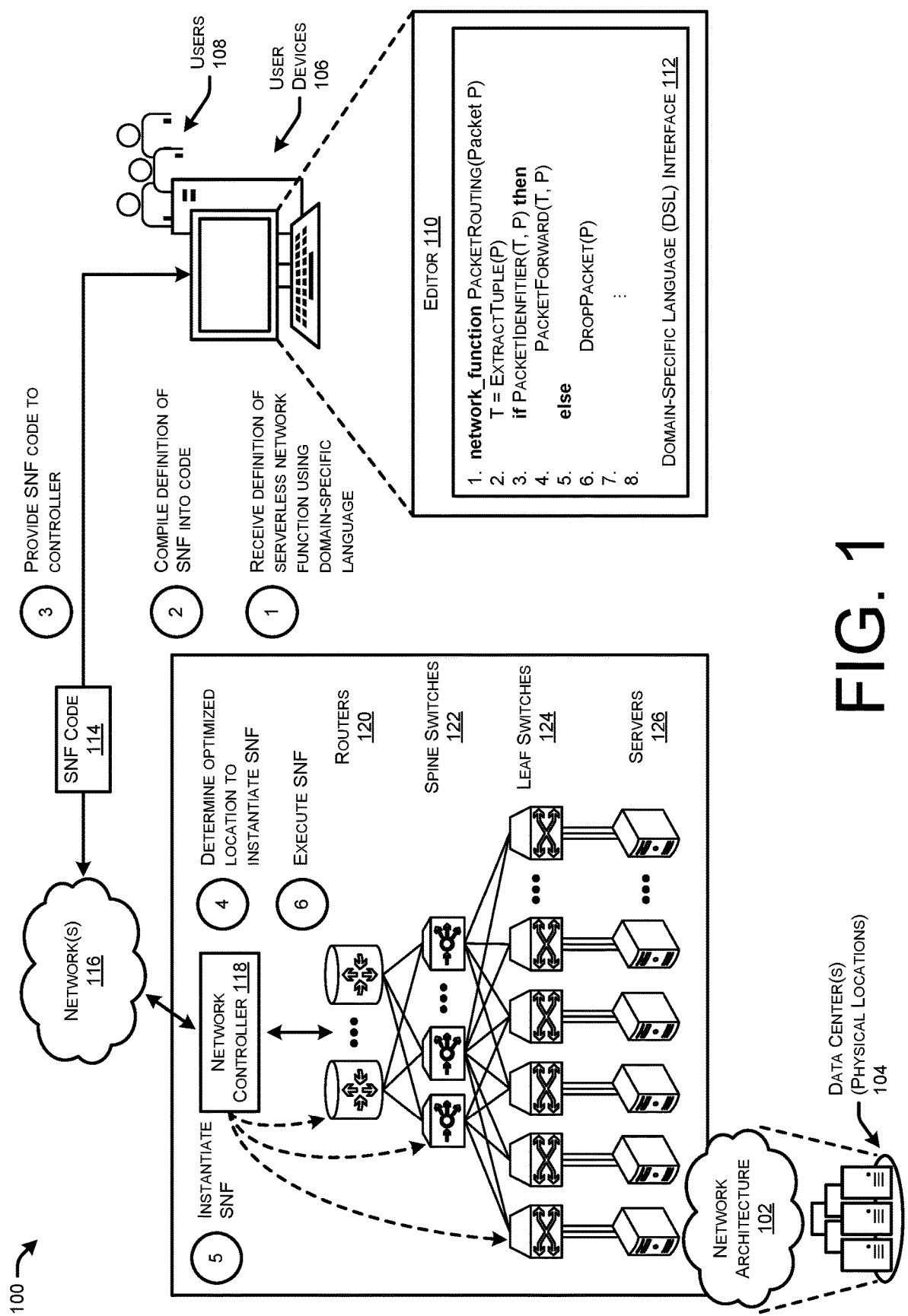
FIG. 1 illustrates a system-architecture diagram of an environment in which a user of a user device utilizes a domain-specific language to express and compile a serverless network function to perform a network operation.

The present disclosure relates generally to using a domain-specific language to express and compile serverless network functions, and optimizing the deployment location for the serverless network functions on network devices.

A first method described herein includes using a domain-specific language (DSL) to generate a serverless network function may include receiving first code, expressed in the DSL, that defines the serverless network function to be executed by a network device. Generally, the DSL is a programming language that is usable to define a plurality of serverless network functions. Some types of network functions may include a packet acquisition function configured to selectively execute on the network device to acquire packets, a packet generation function, a packet duplication function, a packet modification function, a packet drop function, a packet forwarding function, and so forth. The first method may further include generating, by a DSL compiler and at least partly using the first code, second code comprising machine-executable instructions that are executable by the network device to perform the serverless network function. The second code may comprise code expressed in at least one of an OpenFlow programming language program, a P4 programming language program, a Linux Extended Berkeley Packet Filter (eBPF) program, a program configured to execute on a smart Network Interface Controller (NIC), a hardware description language associated with at least one of a Field-Programmable Gate Array (FPGA) or an Application Specific Integrated Circuit (ASIC), or a Vector Packet Processor (VPP) program.

A second method described herein includes using a domain-specific language (DSL) and a general-purpose language (GPL) to generate a serverless network function. The second method may include receiving first source code, expressed in the DSL, that defines a first portion of the serverless network function to be executed by a network device. Generally, the DSL may be usable to define a plurality of serverless network functions. The second method may further include receiving second source code, expressed in the GPL, that defines a second portion of the serverless network function. In some instances, the GPL may include at least one of a Go Programming language, a Rust programming language, or a Python programming language. The second method may additionally include generating, at least partly using a compiler, the first source code, and the second source code, object code comprising machine-executable instructions that are executable by the network device to perform the serverless network function.

A third method described herein includes identifying a network component from a plurality of network components in a network on which to deploy a network function. The third method may include receiving, by a controller of the network, code that represents the network function. Additionally, the third method may include determining, by the controller, a characteristic associated with execution of the network function. Further, the third method may include selecting, from amongst the plurality of network components in the network, the network component as being optimized to execute the network function based at least in part on the characteristic. Even further, the third method may include deploying, by the controller, the code that represents the network function to the network component.

Additionally, the techniques of at least the first method, second method, and third method, and any other techniques described herein, may be performed by a system and/or device having non-transitory computer-readable media storing computer-executable instructions that, when executed by one or more processors, performs the method(s) described above.

Example Embodiments

Computer networking has continued to evolve and become more complex in terms of how network devices are controlled or instructed to communicate data through network architectures. For instance, SDN technologies emerged, continue to evolve, and generally include using a controller such that the control plane is abstracted from the data forwarding function in the discrete networking devices. The controller manages and controls various control plane functions, such as providing layer-2 reachability information and layer-3 routing information to network devices that require this information to make packet-handling decisions. The network devices and components handle data plane functions, such as forwarding or routing decisions, packet-drop operations, and so forth, based on the control plane information received from the controller.

As noted above, network devices traditionally executed or ran the different types of network functions directly on hardware of the network devices (e.g., bare metal implementation). However, due to inefficiencies in running the network functions directly on hardware, various NFV technologies have emerged in order to separate network functions from underlying hardware to create a virtualized network that can run on commodity hardware, allowing networks to be more flexible and cost-effective. Using these NFV technologies, network devices now execute VNFs that handle specific network functions, such as firewall-functions, load-balancing functions, packet-routing functions, and so forth. Thus, there has been a shift in networking from using several pieces of hardware, each performing a single function, to having VMs and/or containers running within a single piece of hardware where each virtual resource is performing the actions of one or more VNFs. However, various inefficiencies and disadvantages still exist when running VNFs in VMs and containers. For example, containers and VMs are generally long-running mechanisms that may be continually spun up and using compute power. Further, it may take resources and time to spin up containers and VMs each time one is needed or requested to perform a VFN.

This disclosure describes techniques and mechanisms for using a domain-specific language (DSL) to express and compile serverless network functions, and optimizing the deployment location for the serverless network functions on network devices. In some examples, the serverless network functions may be expressed entirely in the DSL (e.g., via a text-based editor, a graphics-based editor, etc.), where the DSL is a computer language specialized to a particular domain, such as a network function domain. In additional examples, the serverless network functions may be expressed and compiled using a DSL in combination with a general-purpose language (GSL). Once the serverless network functions have been expressed and/or compiled, the techniques of this disclosure further include determining an optimized network component on which the serverless network function is to execute, and deploying the serverless function to the optimized network component.

Generally, a domain-specific language, or DSL, is a computer language specialized to a particular domain. This disclosure describes a DSL that is specialized to express networking functions that are to be performed by network devices (e.g., routers, switches, etc.). The DSL is then able to be compiled into code that represents serverless network functions that are executable by network devices to perform various actions, such as packet-acquisition functions, packet-generation functions, packet-duplication functions, packet-drop functions, packet-forwarding functions, and so forth. Similar to how Hypertext Markup Language (HTML) is a DSL for creating web pages, the DSL described herein may be specific or specialized to express network functions, and more specifically, serverless network functions.

As described herein, a serverless function is generally a programmatic function where a piece of code is executed dynamically, such as in response to a predefined event. Thus, resources needed to execute a serverless function are similarly allocated dynamically, or allocated at run time, in contrast with the computing resources needed to support long-running VMs or containers. Thus, a serverless network function may comprise a network function (e.g., packet-drop function, packet-forward function, etc.) that is dynamically executed in response to a particular event, such as a network device receiving one or more packets in a flow. Serverless network functions may be used to perform a variety of networking functions, and be deployed to different network devices based on the functions those devices perform in the network architecture.

Thus, a user of a user device may express serverless network functions using a DSL that is a specialized, or domain specific, programming language usable to express networking functions. The DSL may comprise a formal programming language comprising a set of instructions that produce a desired result by a serverless network function. For instance, the DSL may be a programming language written in an imperative form (e.g., sequence of operations to perform), a declarative form (e.g., the desired result is specified), and/or another form. Generally, the DSL may be a programming language that has syntax (or form) as well as semantics (or meaning), and may be defined by a standard or specification (e.g., the C programming language is specified by an ISO Standard). Further, the DSL may have various built-in libraries, functions, APIs, and so forth.

In some examples, users of user devices may run an editor on their user devices to receive input that expresses a serverless network function at least partly using the DSL. The input may be text-based input, graphics-based input, and/or a combination thereof. For instance, text may be input into the editor that represents a portion of a serverless network function in the DSL, graphical icons may be placed into the editor that represents at least a portion of a serverless network function in the DSL, and/or a combination thereof. Once a user has expressed a serverless network function using the DSL, the user may run a compiler, which may be a DSL-specific compiler, transpiler, etc., to compile to target code, or generate target code, of the serverless network function.

In some examples, the techniques described herein may include using a combination of the DSL and a general-purpose language (GPL) to express and create serverless network functions. For instance, by knowing the nature of the DSL and GPL(s), the techniques described herein include compiling source code written using a combination of DSL and GPL into code (such as object code or other machine code) that is executable to perform one or more serverless network functions. The GPL may comprise any type of GPL usable to define network functions, such as a Go programming language (often referred to as "Golang"), a Rust programming language, a Python programming language, a P4 programming language, an OVSDB programming language, and/or any other language that is usable to define network functions.

In some instances, the DSL and GPL may integrate such that the different languages represent different components or portions of one or more serverless network functions. For instance, the DSL and GSL portions of the serverless network function(s) may integrate using built in connections. As an example, a component may be expressed in the DSL, and a component may be expressed in a GPL, such as Rust or Golang, and the DSL and GPL may interface or interact using channels (e.g., asynchronous channels). That is, Rust channels and Golang channels may be used as pipes to connect concurrently running components, such as a DSL-based component and a GPL-based component. In another example where the GPL is a Python language, the DSL-based component and a GPL-based component may be connected using the asyncio library (e.g., a set of high-level APIs, low-level APIs, etc.) which is utilized to connect the asynchronous components.

In some instances, the DSP and GPL may integrate according to other techniques. For instance, the DSL may be designed to allow GPL code to be embedded into the DSL code and compiled (or transpiled) into a combined piece of code. Alternatively, the DSL may be configured such that the DSL code may be able to be embedded into GPL code and compiled (or transpiled) into a combined piece of code. The compiler may be configured to ensure that the resulting code is a combination of the functionality expressed in DSL and the functionality expressed in GPL, as well as the cross-link between the portions of the resulting code expressed in the different languages. By combining the DSL with a GPL, a user is provided the benefit of being able to use the DSL to succinctly express a serverless network function, and also provided the benefit of being able to use a GPL, which the user may be familiar with, to express a portion of the serverless network function. The compiler may be configured to identify which portions of the code are written in the DSL versus GPL (e.g., identify semantics, identify syntax, etc.), and ensure that the portions of the code are appropriately compiled into a desired piece of output code.

Once a user has finished expressing a serverless network function via an editor using either the DSL on its own or in conjunction with a GPL, the user may cause a compiler to compile the code into a desired target code. The target code that represents the serverless network function may then be sent to a network controller that manages the network architecture in which the serverless network function is to be deployed. The network controller may be configured to determine a network component on which the serverless network function is to be deployed. The network controller may determine an optimized placement for the serverless function to execute, or network component in the network architecture on which to run the serverless network function.

The network controller may manage the network architecture, and maintain data regarding the state and layout of the network architecture. The controller may utilize this information and data to determine a location, or a network component/device, on which to deploy the serverless network functions. That is, the controller may determine a network component that has characteristics which are optimal for executing the serverless network function based on a type or characteristic of the serverless network function.

As an example, the controller may maintain a model or other representation of a layout or architecture of the network that the controller is managing. This may include locations of network components in the network (e.g., near the edge of the network, near application servers, etc.), and/or functions of different network devices in the network (e.g., firewall components, routing components, etc.). The controller may determine locations at which to deploy serverless network functions based on a location and/or functionality of network components. For instance, the controller may determine that a serverless network function is a firewall function, or a packet-drop function. In such examples, the controller may determine that it would be more optimal to execute the packet-drop serverless network function on a network component that is at or near the edge of the network architecture. In this way, packets that are dropped do not need to flow through devices of the network, thereby using resources, but may instead be dropped at the edge of the network.

As another example, the controller may collect and/or analyze telemetry data indicating an availability of one or more computer resources of network components in the network (e.g., compute resources, storage resources, networking resources, memory resources, etc.). In such examples, the controller may determine to deploy a serverless network function to a network component that has excess resource capacity, or at least sufficient availability of resources, to host the serverless network function. In some instances, the controller may determine an optimized network component on which to deploy the serverless network function based on a primary resource type consumed by the serverless network function, and the availability of resources of the network components. For instance, a serverless network function that maintains a routing table may be deployed to a network component with excess memory, and a serverless network function that does packet processing may be deployed to a network component with excess computing resources.

As an even further example, the controller may monitor or otherwise determine software locality for various software functions, such as applications being hosted in a Software-as-a-Service (SaaS) environment. In such examples, the controller may further determine that the serverless network function is configured to be attached to a specific SaaS compute function and perform a serverless network function specific to that SaaS compute function. In such examples, the controller may determine to deploy the serverless network function on a same host as, or on a neighboring host to, the SaaS compute function to work seamlessly in conjunction with the SaaS compute function.

While these are merely illustrative examples, other criteria or characteristics (discussed further below) may be considered when determining an optimal, or optimized, network component on which to deploy and run the serverless network function. Although the techniques for determining optimized network components are described primarily with respect to serverless network functions, the techniques are generally applicable to any type of network behavioral elements. That is, the techniques for optimizing placement of serverless network functions are generally applicable to any piece of software code that is a piece of networking behavior tailored to run in a convenient runtime environment (hardware or software) on a component in the network.

As described herein, a network component may comprise any type of component, hardware-based, software-based, etc., that is capable of hosting or running a serverless network function. For example, a network component may comprise hardware-based devices such as a router, a network switch (e.g., leaf switch, spine switch, etc.), a gateway, a network interface card (NIC), a smart NIC, a server, a Field Programmable Gate Array (FPGA), an Application-Specific Integrated Circuit (ASIC), and/or any other hardware device capable of executing a serverless network function. The network component may comprise a software-based component as well, such as a virtual machine, container, and so forth.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an environment 100 that includes a network architecture 102 that may include one or more data centers 104, and in which users 108 of user devices 106 utilize a domain-specific language to express and compile serverless network functions to perform network operations. FIG. 1 further illustrates a network controller 118 in the network architecture 102 deploying the serverless network function at an optimal location (e.g., on an optimal network component or device) in the network architecture 102.

In some examples, the network architecture 102 may include devices housed or located in one or more data centers 104. The network architecture 102 may include one or more networks implemented by any viable communication technology, such as wired and/or wireless modalities and/or technologies. The network architecture 102 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network architecture 102 may include devices, virtual resources, or other nodes that relay packets from one network segment to another by nodes in the computer network. The network architecture 102 may include multiple devices that utilize the network layer (and/or session layer, transport layer, etc.) in the OSI model for packet forwarding, and/or other layers. The network architecture 102 may include various hardware devices, such as routers, switches, gateways, smart NICs, NICs, ASICs, FPGAs, servers, and/or any other type of device. Further, the network architecture 102 may include virtual resources, such as VMs, containers, and/or other virtual resources.

The one or more data centers 104 may be physical facilities or buildings located across geographic areas that designated to store networked devices that are part of the network architecture 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the packet-forwarding networks 102 may not be located in explicitly defined data centers 104, but may be located in other locations or buildings.

The user devices 106 may establish communication connections over one or more networks 116 to communicate with devices in the network architecture 102, such as a network controller 118 of the network architecture 102. The network(s) 116 may include any viable communication technology, such as wired and/or wireless modalities and/or technologies. Networks 116 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The user devices 106 may communicate using any type of protocol over the network 116, such as the transmission control protocol/Internet protocol (TCP/IP) that is used to govern connects to and over the Internet.

As illustrated, the user devices 106 may be running an editor 110 that is presented in a DSL interface 112 and that is configured to receive input using a DSL to express and create serverless network functions. As illustrated, the editor 110 may receive, at "1," portion of source code, which is simply be illustrated as pseudocode, representing an example packet-routing serverless network function expressed by the user 108. The user 108 may express a serverless network function using text input, graphical icons, and/or a combination thereof. In some instances, all of the source code representing the serverless network function may be expressed using the DSL, and in other examples, a first portion of the source code may be expressed using the DSL, and a second portion of the source code may be expressed using a GPL, such as Golang, Rust, Python, P4, and so forth, As "2," a compiler running on the user device 106 may compile the definition, or expression, of the serverless network function into a target code. The compiler running on the user device 106 may comprise any type of compiler, such as a DSL-specific compiler, a transcompiler/transpiler configured to compile DSL-based input and GPL-based input into serverless network functions, and/or any other type of compiler. The compiler may be configurable to compile the serverless network definition from the DSL-based expression (e.g., source code) into target code of a plurality of different programming languages. For instance, the source code may compile into target code in various languages, such as an OpenFlow programming language program, a P4 programming language program, a Linux Extended Berkeley Packet Filter (eBPF) program, a program configured to execute on a smart Network Interface Controller (NIC), a hardware description language associated with at least one of a Field-Programmable Gate Array (FPGA) or an Application Specific Integrated Circuit (ASIC), or a Vector Packet Processor (VPP) program.

At "3," the user device 106 may provide the SNF code 114 to the network control 118. For instance, the user 108 of the user device 106 may provide SNF code 114 to the network controller 118 over the network(s) 116 and via a web-accessible portal, via an API, via an interface (e.g., CLI), and/or through any other mechanism. Although the expression of the serverless network function may be compiled from source code into a target code locally on the user device 106, in some instances, the source code may be sent as SNF code 114 to the network controller 118. Thus, the SNF code 114 may be in any programming language, post-compilation or pre-compilation, and generally correspond to a serverless network function.

At "4," the network controller 118 may determine an optimized location to deploy and instantiate the serverless network function. As described in more detail with respect to FIG. 9, the network controller 118 may determine the optimized location at which to deploy the serverless network function based on various criteria or characteristics, such as a computing-resource capacity, management difficulty for the controller 118, cost for running the serverless network function on a particular network component, security concerns, application locality (e.g., attaching a serverless network function to a specific SaaS compute function), a type of the serverless network function (e.g., the action performed), the type of target code of the SNF code 116, and so forth.

Generally, the network architecture 102 may include various network devices and components, such as routers 120, spine switches 122, leaf switches 124, servers 126, and/or other network components. Although not illustrated, the network architecture may additionally, or alternatively, include gateways, NICs and smartNICs, FPGAs, ASICs, virtual machines, containers, and/or any other type of hardware-based or software-based network component.

At "5," the network controller 118 may instantiate and/or deploy one or more serverless network functions on a network component in the network architecture 102. In some instances, instantiating the serverless network function may include using secure connection, such as a Secure Sockets Layer (SSL) connection, to securely load the SNF code 114 onto the network component.

At "6," the serverless network function may execute to perform the network action that the serverless network function is programmed to perform. Generally, serverless network functions may be executed based on an event, such as an event that calls a particular API which invokes the appropriate serverless network function. As an example, a router 120 may receive a packet using a packet-acquisition SNF, and an event may be triggered (e.g., API invoked) based on the packet-acquisition SNF being used to receive the packet. For instance, the event may trigger a packet-drop SNF that determine whether the packet is to be dropped or not based on various criteria, such as a source address of the packet. Additionally, a packet-forwarding function may be called in order to determine what link the packet is to be forwarded down based on information in the header of the packet. Thus, one or multiple SNFs may be called to analyze a packet and determine how to process the packet at a network component.

In this way, serverless network functions may be dynamically executed in order to perform network functions that are traditionally performed using VNFs that are executed as long-running VMs or containers. However, the techniques described herein include using a DSL that is capable of expressing network functions in a programmatic way such that they can be compiled and deployed via serverless methods and in concert with existing serverless computing functions.

Figure 2:
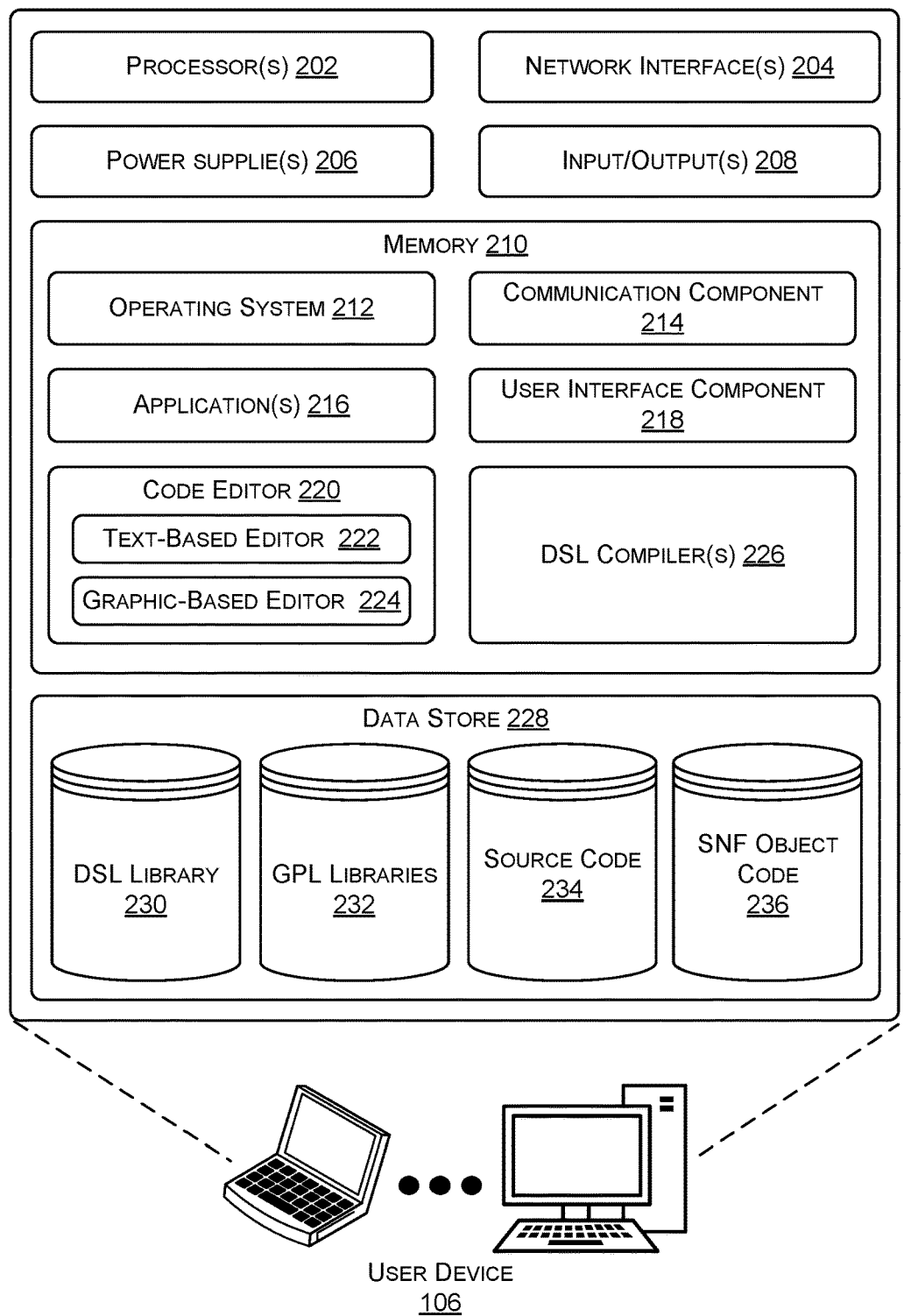
FIG. 2 illustrates a component diagram of an example user device through which a user can express and compile serverless network functions at least partly using a domain-specific language for expressing serverless network functions.

FIG. 2 illustrates a component diagram 200 of an example user device (e.g., user device 106) through which a user can express and compile serverless network functions at least partly using a domain-specific language for expressing serverless network functions. The user device 106 may be any type of computing device capable of receiving expressions of serverless network functions via a DSL interface 112 and sending SNF code 114 to the network 116 via a suitable data communications network such as, but not limited to, a laptop or desktop computer, a tablet computing device, a server computer, a television, or a mobile telephone.

As illustrated, the user device 106 may include one or more hardware processors 202 (processors), one or more devices, configured to execute one or more stored instructions. The processor(s) 202 may comprise one or more cores. Further, the user device 106 may include one or more network interfaces 204 configured to provide communications between the user device 106 and other devices, such as the network controller 118, and/or other systems or devices in the network architecture 102 and/or remote from the network architecture 102. The network interfaces 204 may include devices configured to couple to personal area networks (PANs), wired and wireless local area networks (LANs), wired and wireless wide area networks (WANs), and so forth. For example, the network interfaces 204 may include devices compatible with Ethernet, Wi-Fi, and so forth.

The user device 206 can include one or more power supplies 206, such as one or more batteries, connections to mains power, etc. The user device 106 can also include one or more inputs and outputs 208 for receiving and processing input from a number of input devices, such as a keyboard, a mouse, a touchpad, a touch screen, an electronic stylus, or other type of input device. Further, the input/outputs 208 can include a display, such as a computer monitor, a flat-panel display, a digital projector, a printer, or other type of output device. It will be appreciated that the user device 106 might not include all of the components shown in FIG. 2, can include other components that are not explicitly shown in FIG. 2, or might utilize an architecture completely different than that shown in FIG. 2.

The user device 106 may also include memory 210, such as computer-readable media, that stores various executable components (e.g., software-based components, firmware-based components, etc.). The memory 210 may generally store components to implement functionality described herein. The memory 210 may store an operating system 212 utilized to control the operation of components of the user device 106. Further, the memory 210 may store a communication component 214 that comprises software (e.g., any protocol stack) to enable the user device 106 to communicate with other devices using the network interface 204. Even further, the memory 210 may store one or more applications 216, which may generally comprise any type of software application to perform various functionalities.

In some instances, the memory 210 may store a user interface component 218 configured to present user interfaces on a display of the user device 106, such as the DSL interface 112 through which the editor 110 receives expressions of serverless network functions written in the DSL. The user device 106 may further store a code editor 220 (e.g., editor 110) that includes a text-based editor 222 as well as a graphic-based editor 224. As described in more detail with respect to at least FIG. 5, the text-based editor 222 may be configured to receive text input that expresses a serverless network function in a DSL, and the graphic-based editor 224 may be configured to receive graphical icons that are expressive of at least portions of a serverless network function according to the DSL. In this way, the code editor 220 may receive expressions of serverless network functions using a DSL via a text-based input, a graphics-based input, and/or a combination thereof.

The memory 210 may further store one or more DSL compilers 226 as well as a DSL and GPL compiler. The DSL compiler(s) 226 may generally comprise any type of compilers that are configured to take source code, input code, human-readable code, etc., analyze it, and generate or produce a computer-readable code (e.g., binary, machine code, object code, byte code, etc.). In some instances, the DSL compiler(s) 226 may, rather than going straight to machine code, go to assemble, or a different human-readable language. The compiler may comprise any type of compiler, including a source-to-source compiler (or transcompiler). For instance, in examples where serverless network functions are expressed using a combination of a DSL and a GPL, the DSL compiler(s) 226 may convert source code of the DSL into source code of the GPL such that all of the source code is in the GPL before ultimately compiling into target code (or machine code). Similarly, the DSL compiler(s) 226 may convert the code of the GPL into source code of the DSL before compiling all of the code expressed in the DSL into target code (such as machine code).

In some instances, the DSL compiler(s) 226 may be configured to accept graphical icons as input that represent portions of a serverless network function. The graphical icons may represent text in the DSL and be transformed into the DSL text prior to being compiled. In other examples, the DSL compiler(s) 226 may be configured to compile the graphical icons directly into machine code. The DSL compiler(s) 226 may be similar to a React (web framework) in that the DSL compiler(s) 226 includes a pre-compiler that is built in where the DSL that is embedded in the GPL is spotted as not being the GPL (e.g., different syntax or semantics) is translated into the GPL such that all of the source code is ultimately pre-compiled into the GPL. The GPL can then be compiled into any desired backend target code or object code. However, in other examples the DSL compiler(s) 226 may include a pre-compiler that spots GPL code that is embedded in the DSL code, and pre-compiles the GPL code into DSL code such that all of the source code is expressed in DSL prior to performing the compiling to a desired target code, or object code. In some instances, the DSL compiler(s) 226 may include a transpiler as in the React example where DSL and GPL can be compiled into a version that can be compiled, if necessary, using the primary language of the compiler (e.g., DSL, GPL, etc.). Thus, the DSL compiler(s) 226 may include one or more compilers that enable a user to utilize the code editor 220 to express serverless network functions using DSL alone, or in combination with a GPL.

The DSL compiler(s) 226 may generally be able to compile into computer code in any computer language that is executable on a plurality of different types of network components. For instance, the DSL compiler(s) 226 may be able to compile into an OpenFlow programming language program, a P4 programming language program a Linux Extended Berkeley Packet Filter (eBPF) program, a program configured to execute on a smart Network Interface Controller (NIC), a hardware description language associated with at least one of a Field-Programmable Gate Array (FPGA) or an Application Specific Integrated Circuit (ASIC), or a Vector Packet Processor (VPP) program, any type of machine code, object code, byte code, machine code, binary, and/or any type of executable code that may be executed by any type of device or network component. Thus, the DSL compiler(s) 226 may be configured to compile source code, written at least partially in a DSL, that expresses or represents a serverless network function into any type of target or output code.

The user device 106 may further include a data store 228, which may comprise any type of computer memory including long-term memory (e.g., Read Only Memory (ROM), Random Access Memory (RAM), caches, etc.). The data store 228 may include a DSL library 230 that includes resources used to express serverless network functions using the DSL, such as macros, type definitions and functions for tasks such as string handling, mathematical computations, input/output processing, memory management, and various other system services. Similarly, the data store GPL libraries 232 may comprise any type of library for any type of GPL language. The data store 228 may include source code that has been expressed by a user of the user device 106, and/or downloaded from code repositories, that represent serverless network functions and/or other programs. Further, the data store 228 may include SNF object code 236 in examples where the source code 234 is compiled locally on the user device 106 by the DSL compiler(s) 226.

Figure 3:
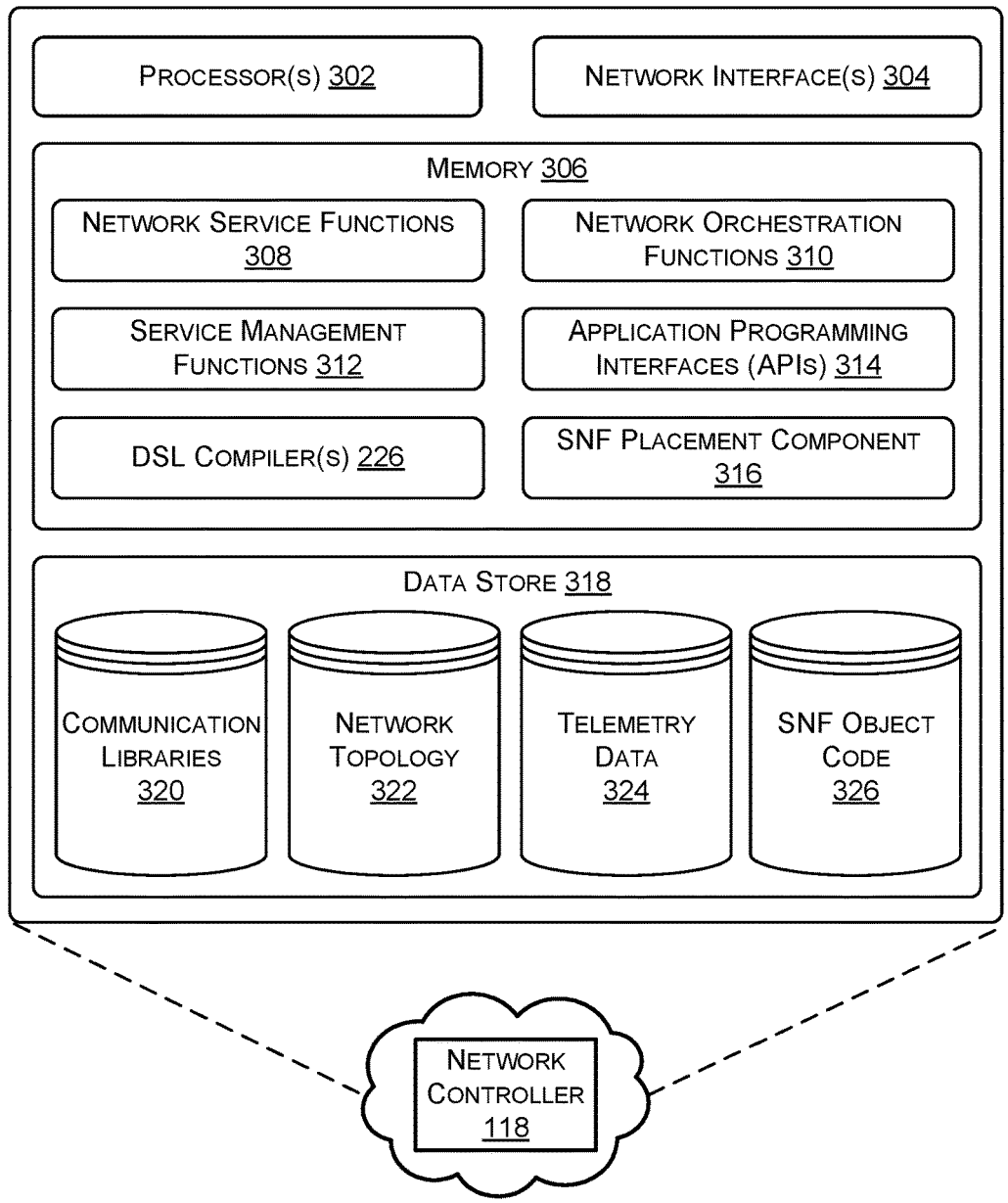
FIG. 3 illustrates a component diagram of an example network controller that receives serverless network functions, and determines an optimized location in a network architecture to which to deploy the serverless network functions.

FIG. 3 illustrates a component diagram 300 of an example network controller (e.g., network controller 118) that receives serverless network functions, and determines an optimized location in a network architecture 102 to which to deploy the serverless network functions. In some instances, the network controller 118 may run on one or more computing devices in, or associated with, the network architecture 102 (e.g., a single device or a system of devices). The network controller 118 may comprise a single controller 118 that is running, or multiple instances of a network controller 118 running at least partly at a same time.

Generally, the network controller 118 may be a programmable controller that manages some or all of the control plane activities of the network architecture 102, and manages or monitors the network state using one or more centralized control models. Generally, the network controller 118 may handle at least the functions of (i) receiving SNF code 114 for serverless network functions (source code, target code, etc.), (ii) identifying a network component in the network architecture 102 that is optimized to host or run the serverless network function, and (iii) deploying or instantiating the SNF code 114 on the network component that is optimized to run the serverless network function.

As illustrated, the network controller 118 may include, or run on, one or more hardware processors 302 (processors), one or more devices, configured to execute one or more stored instructions. The processor(s) 302 may comprise one or more cores. Further, the network controller 118 may include or be associated with (e.g., communicatively coupled to) one or more network interfaces 304 configured to provide communications with the user device 106 and other devices, and/or other systems or devices in the network architecture 102 and/or remote from the network architecture 102. The network interfaces 304 may include devices configured to couple to personal area networks (PANs), wired and wireless local area networks (LANs), wired and wireless wide area networks (WANs), and so forth. For example, the network interfaces 304 may include devices compatible with any networking protocol The network controller 118 may also include memory 306, such as computer-readable media, that stores various executable components (e.g., software-based components, firmware-based components, etc.). The memory 306 may generally store components to implement functionality described herein as being performed by the network controller 118. The memory 306 may store one or more network service functions 308, such as a slicing manager, a topology manager to manage a topology of the network architecture 102, a host tracker to track what network components are hosting which programs or software, a switch manager to manage switches of the network architecture 102, a process manager, and/or any other type of function performed by the network controller 118.

The network controller 118 may further include network orchestration functions 310 stored in memory 206 that perform various network functions, such as resource management, creating and managing network overlays, programmable APIs, provisioning or deploying applications, software, or code to hosts, and/or perform any other orchestration functions. Further, the memory 306 may store one or more service management functions 312 configured to manage the specific services of the network architecture 102 (configurable), and one or more APIs 314 for communicating with devices in the network architecture 102 and causing various control plane functions to occur. In some instances, the network controller 118 may include a plurality of compilers, such as the DLS compiler(s) 226, and use the DSL compiler(s) 226 to compile source code into target code before deploying the code to the network components. However, this occurs in instances when the user device 106 has not compiled the source code 234 into the final SFN object code 236.

Further, the network controller 118 may include an SNF placement component 316 that is configured to determine optimized (or advantageous) network components on which to run serverless network functions, and deploying/instantiating the serverless network functions on those network components. As described in more detail in FIG. 9, the SNF placement component 316 may determine the optimized network component on which to deploy and instantiate serverless network functions based on various criteria or characteristics, such as a computing-resource capacity, management difficulty for the controller 118, cost for running the serverless network function on a particular network component, security concerns, application locality (e.g., attaching a serverless network function to a specific SaaS compute function), a type of the serverless network function (e.g., the action performed), the type of target code of the SNF code 116, and so forth.

The network controller 118 may further include a data store 318, such as long-term storage, that stores communication libraries 320 for the different communication protocols that the network controller 118 is configured to use or perform. Additionally, the data store 318 may include network topology data 322, such as a model representing the layout of the network components in the network architecture 102. The data store 318 may store telemetry data 324 that indicates computing resource usage and/or availability on the different network components in the network architecture 102. Additionally, the data store 318 may store SNF object code 326 (which it may receive and/or generate) that is to be deployed, and/or has been deployed, on network components.

Figure 4:
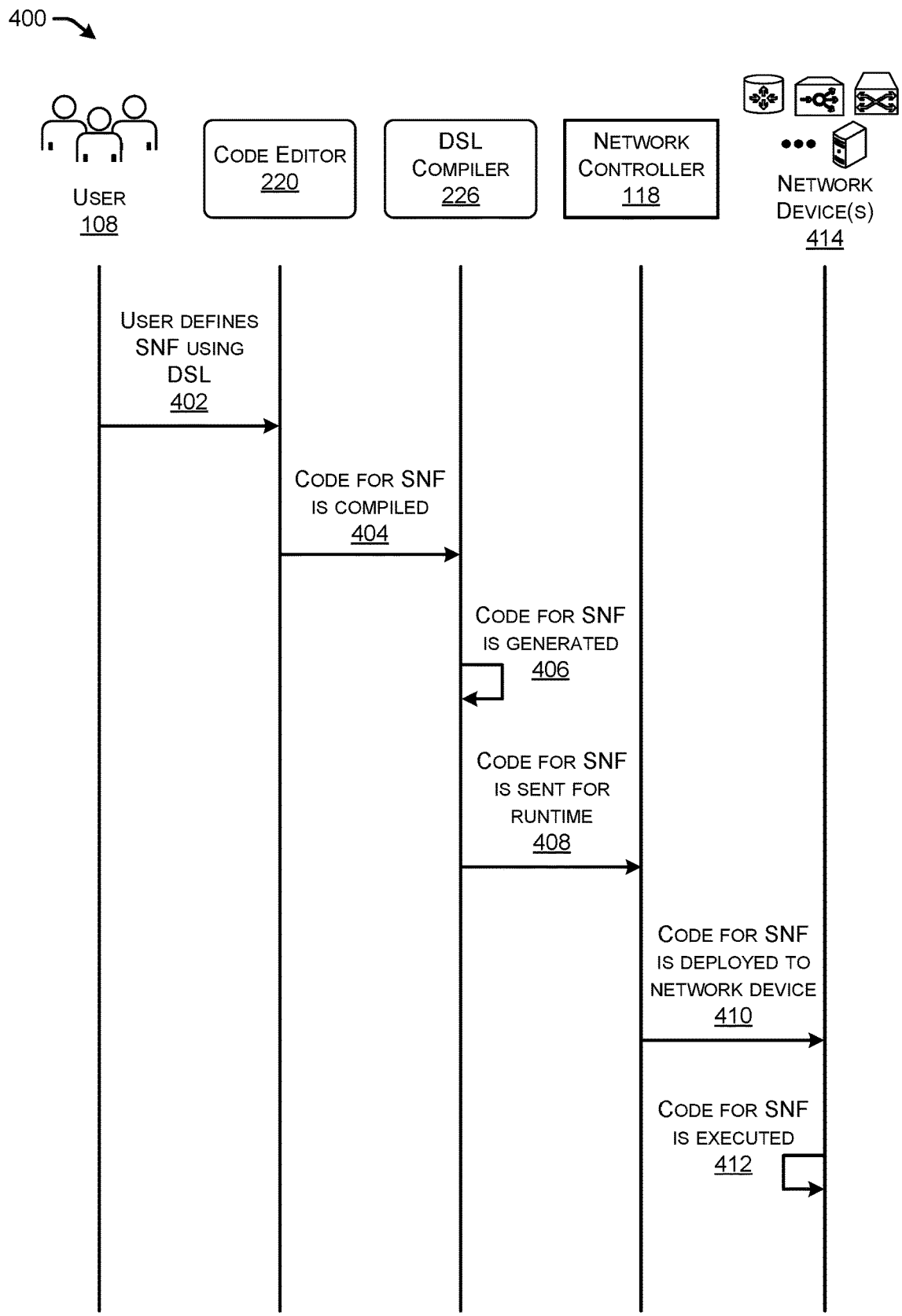
FIG. 4 illustrates a flow diagram of an example method for a user of a user device to express a serverless network function, for a domain-specific language compiler to generate code for executing the serverless network function, and for a network controller to deploy the code of the serverless network function to one or more network devices in a network architecture.

FIG. 4 illustrates a flow diagram of an example method 400 for a user of a user device 106 to express a serverless network function, for a domain-specific language compiler 226 to generate code for executing the serverless network function, and for a network controller 118 to deploy the code of the serverless network function to one or more network devices or components in a network architecture 102.

At 402, a user 108 may define a serverless network function using a DSL. For instance, the user 108 may interact with the code editor 220 to input text-based input, graphic-based input, and/or a combination thereof. The code editor 220 may receive the input from the user 108 that expresses or defines the serverless network function at least partially in the DSL.

At 404, the code representing the serverless network function may be compiled by the DSL compiler 226. The DSL compiler 226 may compile the source code into any desired target code (or object code). In some instances, the DSL compiler 226 may compile the source code into a target code that is configured to be executed by the destination network component (e.g., a target code may be selected based on a type of code the network component is able to execute). At 406, the DSL compiler 226 may generate code for the SNF. For instance, the DSL compiler 226 may generate target code based on a type of a destination network device.

At 408, the target code for the serverless network function is sent for runtime. More specifically, the user device 106 may send the target code to the network controller 118. The network controller 118 is then tasked with determining a network device on which the serverless network function is to be deployed.

At 410, the network controller 118 determines which network device 414 (or network component 414) on which to deploy the code for the SNF. Various characteristics or criteria may be considered with respect to the serverless network function and the network device 414 in order to identify an optimized network device 414 on which to deploy the code representing the serverless network function. The network controller 118 may then deploy the code for the serverless network function to the network device 414 that has been determined to be optimized for running the serverless network function.

At 412, the code for the serverless network function may be executed by a network component and/or the network device 414. For instance, an event may have occurred that triggered the serverless network function to execute and dynamically perform the network action (e.g., a packet was received at the network device 414 that needed to be acted on).

Figure 5:
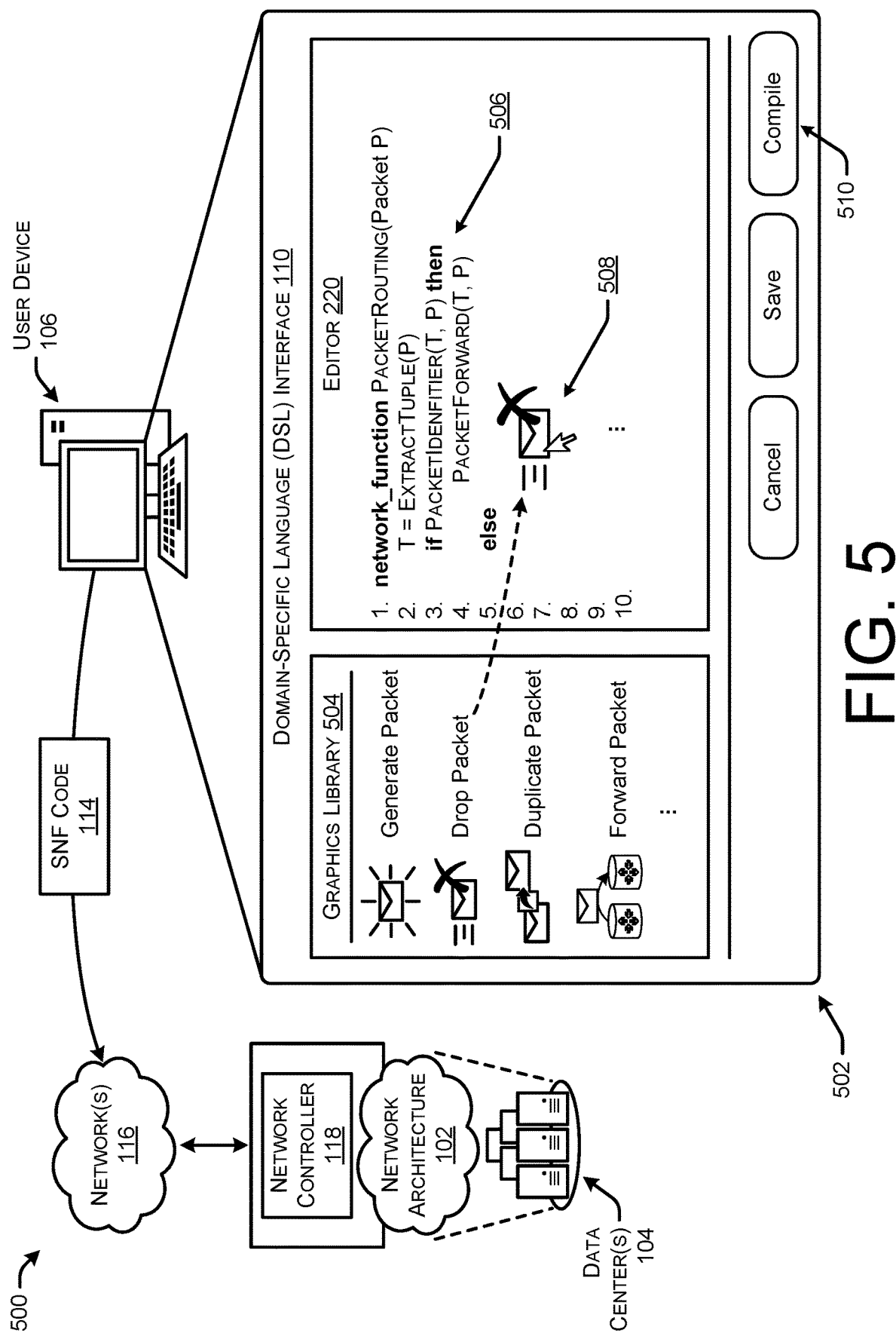
FIG. 5 illustrates a graphical user interface presented on a user device by which a user may express a serverless network function using text, graphical icons, and/or a combination thereof.

FIG. 5 illustrates an example environment 500 in which a graphical user interface (GUI) 502 is presented on a user device 106 by which a user 108 may express a serverless network function using text, graphical icons, and/or a combination thereof.

As illustrated, the GUI 502 may present or include the DSL interface 110 through which the user 108 of the user device 106 may express a serverless network function at least partly using a DSL via the editor 220. As noted above, the editor 220 may include a text-based editor 222 and/or a graphic-based editor 224. As illustrated, the DSL interface 110 may include a graphics library 504 that includes one or more visual graphics or icons that may be used to express at least a portion of a serverless network function. The graphics that are shown in the graphics library may be used to express a serverless network function in the DSL such that the graphics are able to be analyzed and compiled by the DSL compiler(s) 226 and used to generate SNF object code 236.

Accordingly, the DSL may be at least partly a visual programming language when serverless network functions may be at least partly defined using visual graphics or icons. As illustrated, there may be graphics in the graphics library 504 that represent different network operations, actions, and/or functions, such as a generate-packet graphic, a drop-packet graphic, a duplicate-packet graphic, a forward-packet graphic, and so forth. However, any types of functions or actions may be represented using a graphic icon, and these are merely illustrative examples. For instance, there may be graphics that represent more granular portions of source code that may be utilized (e.g., code functions, code variables, etc.).

As further illustrated, the DSL interface 110 may include a portion to receive text to express a serverless network function in a DSL. The text portion 506 illustrated is merely an example using pseudo code, and the DSL may be a specialized programming language that is used for the purpose of expressing and creating serverless network functions that execute to perform networking functions. The DSL may comprise a formal programming language comprising a set of instructions that produce a desired result. For instance, the DSL may be a programming language written in an imperative form (e.g., sequence of operations to perform), a declarative form (e.g., the desired result is specified), and/or another form. Generally, the DSL may be a programming language that has syntax (or form) as well as semantics (or meaning), and may be defined by a standard or specification (e.g., the C programming language is specified by an ISO Standard). Further, the DSL may have various built-in libraries, functions, APIs, and so forth.

As illustrated, a user 108 of the user device 106 may input a text portion 506 as well as a graphic portion 508 to express a serverless network function in the DSL. In some instances, the graphic portion 508 may be toggled back-and-forth between an icon and text that corresponds to the icon. In this way, a user 108 may utilize a graphic/icon from the library 504 and quickly toggle to text to finalize the piece of code. Thus, the editor 220 may allow users 108 to express serverless network functions in a DSL that supports text-based input, graphical/icon-based input, and/or a combination thereof. In the illustrated example, the text input 506 may indicate a function for packet routing that routes a packet along a particular path if the packet is identified, and otherwise drops the packet as indicated by the graphic 508 used in the else statement. Again, this is merely an illustrative example and the DSL may be expressed or defined by any semantics or syntax.

OpenFlow is an example of a control plane protocol that is utilized by network controllers. An illustrative example of using the DSL language and mapping into an OpenFlow action set is explained below. However, similar patterns emerge when using languages such as P4, eBPF, and so forth.

Packet acquisition: Packet acquisition may be accomplished by creating a port on an OpenFlow switch such that traffic of a certain pattern could arrive to this port. The equivalent OpenFlow action is OFPT_PACKET_IN.

Packet generation: Packet generation may involve using an OpenFlow port on a switch to allow the DSL to generate packets which come out of this port. The equivalent OpenFlow action is OFPT_PACKET_OUT.

Packet duplication: Packet duplication may be accomplished in that the DSL allows for OFPT_PACKET_IN to receive a packet, and then the DSL itself would generate code to copy this packet.

Packet modification: Packet modification may involve using the DSL to allow for OFPT_PACKET_IN to receive a packet, and then allow for packet modification via some generated code. This could also use OFPT_FLOW_MOD to allow this on a per-flow basis.

Packet drop: Packet drop may involve using the DSL to setup an OFPT_TABLE_MOD to setup a drop for a packet type specified by the user through the DSL.

Packet forwarding down a specific link: Packet forwarding may involve using an OFPT_TABLE_MOD to allow for a specific packet type to be sent somewhere.

Figure 6:
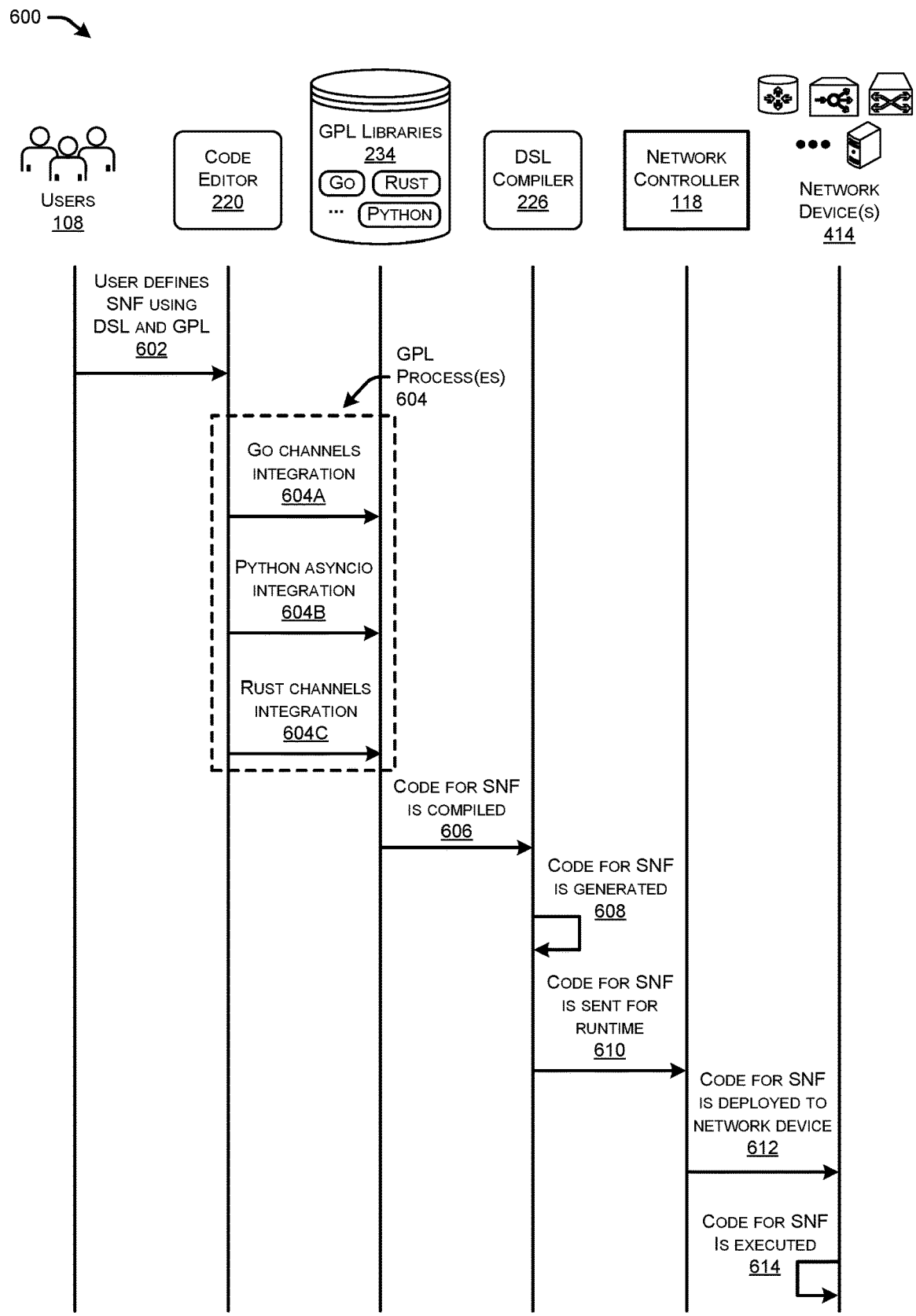
FIG. 6 illustrates a flow diagram of an example method for a user of a user device to express a serverless network function using a domain-specific language as well as a general-purpose language, for a compiler to generate code for executing the serverless network function, and for a network controller to deploy the code of the serverless network function to one or more network devices in a network architecture.

FIG. 6 illustrates a flow diagram of an example method 600 for a user 108 of a user device 106 to express a serverless network function using a domain-specific language as well as a general-purpose language, for a compiler to generate code for executing the serverless network function, and for a network controller to deploy the code of the serverless network function to one or more network devices in a network architecture.

At 602, the user 108 may define a serverless network function using a DSL as well as a GPL. The GPL may comprise any type of GPL usable to define network functions, such as a Go programming language, a Rust programming language, a Python programming language, a P4 programming language, an OVSDB programming language, and/or any other language that is usable to define network functions.

At 604, the code editor 220 may initiate one or more GPL processes 604 based on the GPL being used in combination with the DSL. For instance, if the user 108 is writing their code using Go language, the code editor 220 would use channels to integrate between hardware/software at 604A. Further, if the user 108 is writing their code in python, the code editor 220 would use asyncio to integrate between hardware/software at 604B. Additionally, if the user 108 is writing their code using Rust, the code editor 220 would use Rust channels to integrate between hardware/software at 604C. As another example, if the user 108 is writing their code in PHP, the editor 220 would map their code using a normal PHP model.

Because the editor 220 and the compiler(s) 226 are configured to know the nature of the DSL and the GPL, they can use that knowledge to find the most efficient way to make the components interact, which is specific to both the nature of the network code and its implementation and to the features of the GPL in use. The low level connection may be further refined by adding a presentation layer in the GPL (for instance, if using Golang channels to feedback information from an NPU by enabling a go thread to probe the NPU and return data, but we cap the channel on the Golang program side with an object that reads the data, interprets it and makes callbacks).

In some examples, channels and asyncio may be used for creating filter paths (e.g. punt paths). Channels and asyncio may be used for various functions, such as Data Over Cable Service Interface Specification (DOCSIS) control messages, IPsec IKE messages, BGP control plane messages. etc. Further, channels and asyncio may be used for various events that may trigger serverless network functions, such as detecting and enforcing thresholds, rate limits, new packet detection, and so forth. Even further, channels and asyncio may be used for logging, such as logging a current packet and history that makes a packet interesting.

At 606, the source code representing the serverless network function may be compiled into a target code by the DSL compiler 226, and at 608, the DSL compiler 226 may generate the target code for the serverless network function. The source code may be generated or compiled into a target code that is in a language that is executable on the destination network component. Thus, the network controller 118 may determine a network component on which to deploy the serverless network function based at least in part on the network component being capable to execute the target code.

At 610, the code may be sent from the DSL compiler 226 to the network controller 118 for runtime. At 612, the network controller 118 may identify an optimal network component on which to execute the serverless network function, and deploy the target code of the serverless network function to the network component. At 614, the code for the serverless network function may be executed by the network component 414.

Figure 7A:
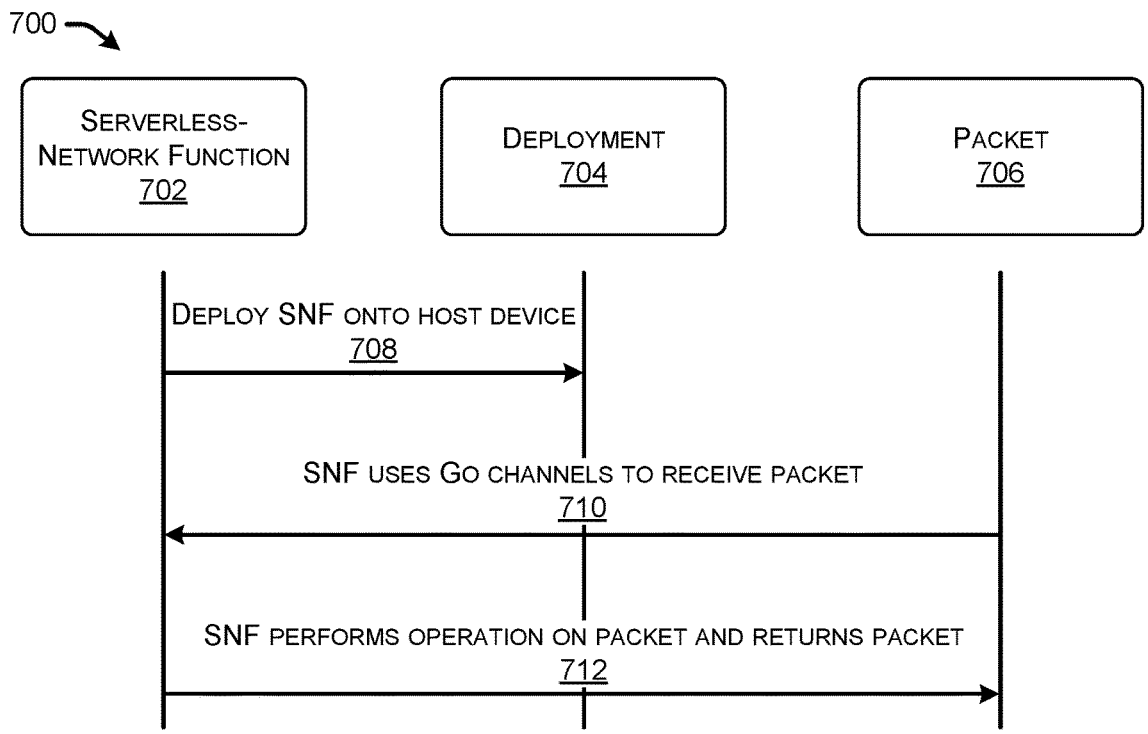
FIGS. 7A and 7B illustrate respective flow diagrams of an example method for a user of a user device to express a serverless network function using a domain-specific language as well as a general-purpose language, for a compiler to generate code for executing the serverless network function, and for a network controller to deploy the code of the serverless network function to one or more network devices in a network architecture. More specifically.
Figure 7B:
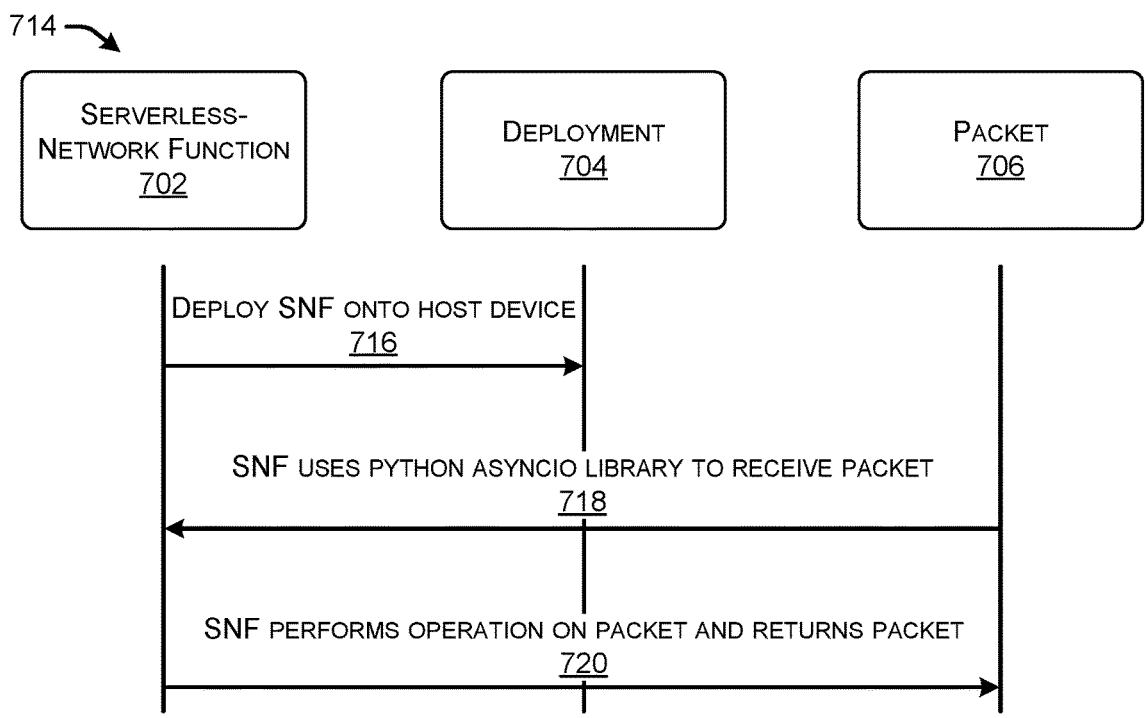

FIGS. 7A and 7B illustrate respective flow diagrams of example methods for a user 106 of a user device 108 to express a serverless network function using a domain-specific language as well as a general-purpose language, for a compiler to generate code for executing the serverless network function, and for a network controller to deploy the code of the serverless network function to one or more network devices in a network architecture. More specifically, FIG. 7A illustrates expressing a serverless network function using the domain-specific language as well as at least one of a Go programming language or a Rust programming language, and FIG. 7B illustrates expressing a serverless network function using the domain-specific language as well as a Python programming language.

Flow diagram 700 of FIG. 7A illustrates an example method of a serverless network function 702 executing on a network component where the serverless network function is expressed using a DSL as well as a GPL, such as Go language. As illustrated, the serverless network function 702 may move to the deployment state at 704. For instance, the network controller 118 may, at 708, deploy code of the serverless network function (e.g., source code, target code, etc.) onto a host device, or a network component as described herein. A packet 706 may be sent to the host device. In such examples, the serverless network function may use a Go channel, at 710, to receive the packet 706. That is, the Go channel provides an interface between the serverless network function written at least partly using the DSL and the hardware layer where the packet 706 is received. At 712, the serverless network function may perform an operation on the packet and return the packet 706, such as duplicating the packet 706, modifying the packet 706, and/or any other function.

Flow diagram 714 of FIG. 7B illustrates an example method of a serverless network function 702 executing on a network component where the serverless network function is expressed using a DSL as well as a GPL, such as Python. As illustrated, the serverless network function 702 may move to the deployment state at 704. For instance, the network controller 118 may, at 716, deploy code of the serverless network function (e.g., source code, target code, etc.) onto a host device, or a network component as described herein. A packet 706 may be sent to the host device from another device. In such examples, the serverless network function may use the Python asyncio library, at 718, to receive the packet 706. That is, the asyncio library provides an interface between the serverless network function written at least partly using the DSL and the hardware layer where the packet 706 is received. At 720, the serverless network function may perform an operation on the packet and return the packet 706, such as duplicating the packet 706, modifying the packet 706, and/or any other function.

Figure 8:
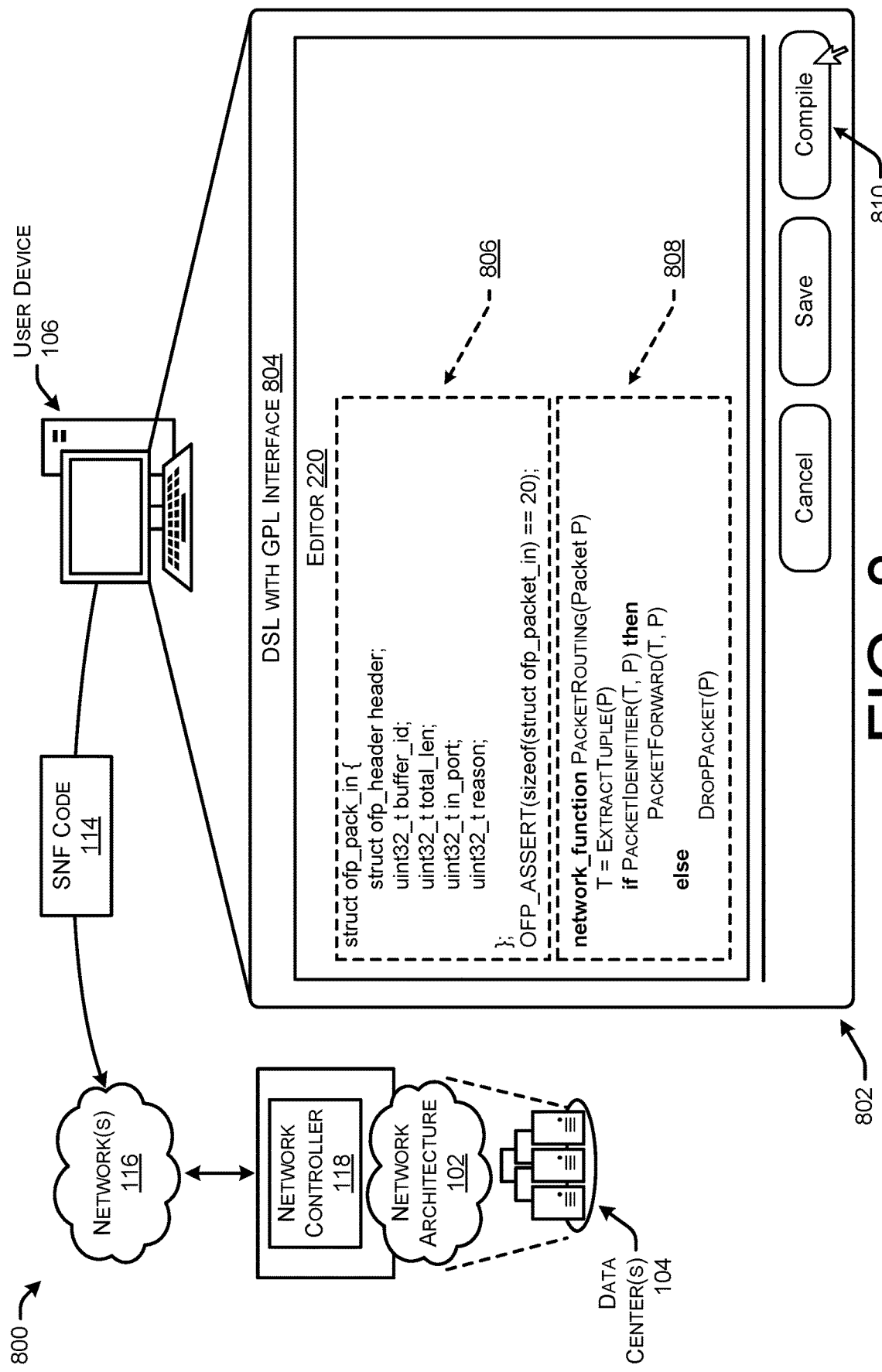
FIG. 8 illustrates a graphical user interface presented on a user device by which a user may express a serverless network function using a combination of a domain-specific language and a general-purpose language.

FIG. 8 illustrates an example environment 800 in which a graphical user interface (GUI) 802 is presented on a user device 106 by which a user 108 may express a serverless network function using a combination of a domain-specific language and a general-purpose language.

As illustrated, the GUI 802 may present or include the DSL with GPL interface 804 through which the user 108 of the user device 106 may express a serverless network function at least partly using a DSL and at least partly using a GPL via the editor 220.

As noted above, the techniques described herein may include using a combination of the DSL and a GPL to express and create serverless network functions. For instance, by knowing the nature of the DSL and GPL(s), the techniques described herein include compiling source code written using a combination of DSL and GPL into code (such as object code or other machine code) that is executable to perform one or more serverless network functions. The GPL may comprise any type of GPL usable to define network functions, such as a Go programming language (often referred to as "Golang"), a Rust programming language, a Python programming language, a P4 programming language, an OVSDB programming language, and/or any other language that is usable to define network functions.

As illustrated in FIG. 8, the interface 804 allows a user 108 to provide input to the editor 220 using a GPL language as well as the DSL language. In the illustrated example, the user 108 has input a GPL portion 806 and a DSL portion 808 in order to define one or more serverless network functions. The GPL portion 806 in this example is an OpenFlow programming language, but the GPL may be any language (e.g., Python, Go language, etc.).

In some instances, the DSL and GPL may integrate such that the different languages represent different components of one or more serverless network functions. For instance, the DSL and GSL portions 806/808 of the serverless network function(s) may integrate using built in connections. For instance, a component may be expressed in the DSL, and a component may be expressed in a GPL, such as Rust or Golang, and the DSL and GPL may interface or interact using channels (e.g., asynchronous channels). That is, Rust channels and Golang channels may be used as pipes to connect concurrently running components, such as a DSL-based component and a GPL-based component. In another example where the GPL is a Python language, the DSL-based component and a GPL-based component may be connected using the asyncio library (e.g., a set of high-level APIs, low-level APIs, etc.)) which is utilized to connect the asynchronous components.

In some instances, the DSP and GPL may integrate according to other techniques. For instance, the DSL may be designed to allow GPL code to be embedded into the DSL code and compiled (or transpiled) into a combined piece of code. Alternatively, the DSL may be configured such that the DSL code may be able to be embedded into GPL code and compiled (or transpiled) into a combined piece of code. The compiler 226 may be configured to ensure that the resulting code is a combination of the functionality expressed in DSL and the functionality expressed in GPL, as well as the cross-link between the portions of the resulting code expressed in the different languages. By combining the DSL with a GPL, the user 108 is provided the benefit of being able to use the DSL to succinctly express a serverless network function, and also provided the benefit of being able to use a GPL, which the user may be familiar with, to express a portion of the serverless network function. The compiler 226 may be configured to identify which portions of the code are written in the DSL versus GPL (e.g., identify semantics, identify syntax, etc.), and ensure that the portions of the code are appropriately compiled into a desired piece of output code.

Once the user 108 has finished expressing a serverless network function via the editor, using the DSL in conjunction with a GPL, the user may select the compile option 810 to cause a compiler 226 to compile the code into a desired target code. The target code 114 that represents the serverless network function may then be sent to a network controller 118 that manages the network architecture 102 in which the serverless network function is to be deployed. The network controller 118 may be configured to determine a network component on which the serverless network function is to be deployed. The network controller 118 may determine an optimized placement for the serverless function to execute, or network component in the network architecture on which to run the serverless network function.

Figure 9:
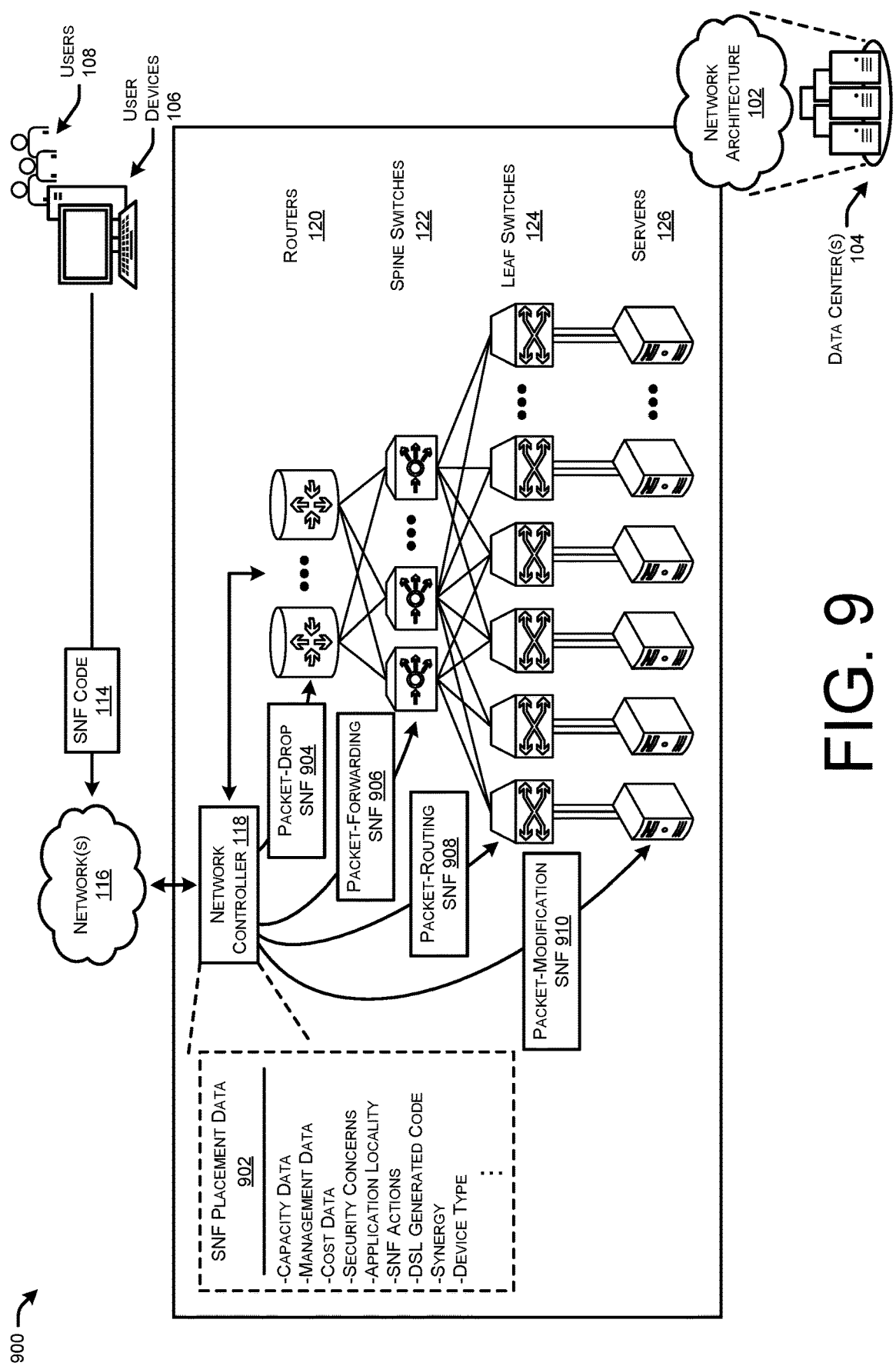
FIG. 9 illustrates a system-architecture diagram of an environment in which a network controller in a network architecture deploys a serverless network function at an optimal location (e.g., on an optimal network component or device) in the network architecture.

FIG. 9 illustrates a system-architecture diagram of an environment 900 in which a network controller 118 in a network architecture deploys a serverless network function at an optimal location (e.g., on an optimal network component or device) in the network architecture 102.

The network controller 118 may manage the network architecture 102, and maintain data regarding the state and layout of the network architecture 102. The controller 118 may utilize this information and data to determine a location, or a network component/device, on which to deploy the serverless network functions. That is, the controller 118 may determine a network component that has characteristics which are optimal for executing the serverless network function based on a type or characteristic of the serverless network function.

The network controller 118 may be configured to evaluate various criteria, characteristics, data, information, etc., to determine an optimal network component in the network architecture 102 at which to place a serverless network function. The network controller 118 may consider criteria, characteristics, data, etc., around at least the serverless network function and the network components. For instance, the network controller 118 may utilize various SNF placement data 902, such as capacity data, management data, cost data, security concerns, application locality, SNF actions, DSL generated code, synergy data, device type, and so forth.

With respect to capacity data 902, the network controller 118 may collect and/or analyze telemetry data indicating an availability of one or more computer resources of network components in the network architecture 102 (e.g., compute resources, storage resources, networking resources, memory resources, etc.). In such examples, the network controller 118 may determine to deploy a serverless network function to a network component that has excess resource capacity, or at least sufficient availability of resources, to host the serverless network function. In some instances, the network controller 118 may determine an optimized network component on which to deploy the serverless network function based on a primary resource type consumed by the serverless network function, and the availability of resources of the network components. For instance, a serverless network function that maintains a routing table may be deployed to a network component with excess memory, and a serverless network function that does packet processing may be deployed to a network component with excess computing resources. The network controller 118 may determine, for instance, a host capacity (e.g., how much is running on potential hosts/network components), a SmartNIC capacity (e.g., how may programs are on the SmartNIC and how full are its tables), a router capacity (e.g., how much can the router handle with respect to running programs), etc. With respect to management data 902, the network controller 118 may determine a difficulty associated with managing the network component that is running the serverless network function. For instance, the network component may be at least partially out of the control of the network controller 118, or be configured to perform operations that the controller 118 does not have control over.

With respect to the cost data 902, the network controller 118 may take into account cost for running a serverless network function on different network components. For instance, it may cost more to run a serverless network function on a host device versus a SmartNIC or a router. In some instances, a compute node may be running low on memory, and it may cost more to run the serverless network function on that compute node. As another example, a SmartNIC may be running as the host (e.g., too much traffic), so the serverless network function may be placed on a different network component/host. Thus, the network controller 118 may have insight into the cost data 902 for running a serverless network function on the network components, and select an optimized network component to run a serverless network function based on a lower cost relative to other network components capable of running the serverless network function.

With respect to the security concerns, the network controller 118 may take into account security concerns with running the serverless network function. For instance, the network controller 118 may determine whether the serverless network function is trusted to run on various network components. For instance, based on the functions the serverless network function is performing, as compared to the data and or functions being performed by the network components, the network controller 118 may determine whether or not to deploy the serverless network function to the network components based on security concerns.

With respect to the application locality for optimizing placement of a serverless network function, the network controller 118 may monitor or otherwise determine software locality for various software functions, such as applications being hosted in a Software-as-a-Service (SaaS) environment. In such examples, the network controller 118 may further determine that the serverless network function is configured to be attached to a specific SaaS compute function and perform a serverless network function specific to that SaaS compute function. In such examples, the network controller 118 may determine to deploy the serverless network function on a same host as, or on a neighboring host to, the SaaS compute function to work seamlessly in conjunction with the SaaS compute function.

With respect to the serverless network function actions, the network controller 118 may determine a type of the serverless network function (e.g., what action or actions does the serverless network function perform), and place the serverless network function. The network controller 118 may maintain a model or other representation of a layout or architecture of the network architecture 102 that the network controller 118 is managing. This may include locations of network components in the network architecture 102 (e.g., near the edge of the network, near application servers, etc.), and/or functions of different network devices in the network architecture 102 (e.g., firewall components, routing components, etc.). The network controller 118 may determine locations at which to deploy serverless network functions based on a location and/or functionality of network components.

As an example, the network controller 118 may determine that a serverless network function is a packet-drop SNF 904. In such examples, the network controller 118 may determine that an optimized location for the packet-drop SNF 904 would be on a router 120, or on another network component that is near the edge of the network architecture 102. In this way, packets that are dropped do not need to flow through as many devices of the network architecture 102, thereby reserving resources, but may instead be dropped at the edge of the network architecture 102. Additionally, the packet-drop SNF 904 may run efficiently on the router 120 at least because the router 120 may be able to efficiently drop packets in hardware (as software drops are more expensive).

For some other examples, the network controller 118 may determine to place a packet-forwarding SNF 906 on a spine switch 122, place a packet-routing SNF 908 on a leaf switch, and/or place a packet-modification SNF 910 on a server 126. The network controller 118 may determine that these network components are optimized based on their location in the network architecture, or based on the actions they perform in the network architecture 102, to execute particular serverless network functions. Further, the packet-modification SNF 910 may be optimized to run on a server 126 or a SmartNIC.

Further, with respect to the DSL generated code 902, the network controller 118 may determine a type of code of the serverless network function, and determine a network component that is capable or optimized to execute the type of code. For instance, the SNF may compile into a code such as an OpenFlow programming language program, a P4 programming language program, a Linux eBPF program, a program configured to execute on a SmartNIC, a hardware description language associated with at least one of an FPGA or an ASIC, a Vector Packet Processor (VPP) program, and/or any other target code or source code. The network controller 118 may select a network component that is capable, or optimized (e.g., run efficiently), to execute the serverless network function based on a type of code of the serverless network function.

Further, the network controller 118 may determine to place a serverless network function on a network component that has synergy with the type of the serverless network function. For instance, the network controller 118 may determine that it is more efficient to run the SNF close to some other network component of the network architecture 102 due to, for instance, the availability of in-memory packet transport The network controller 118 may determine a network component that is optimized to run the serverless function, and to deploy the serverless network function to, based on one or more (either individually or in combination) of the SNF placement data discussed herein.

Further, the network controller 118 may deploy the SNF code 114 and have one or more mechanisms by which to deploy the SNF code 114. For instance, when deploying the SNF code 114 onto a host itself (e.g. on a Linux bridge, an Open vSwitch switch, eBPF, VPP, etc.), the network controller 118 may simply load the generated code onto the host. The SNF code 114 as generated may dictate the backend target network component, thus constraining the placement. In some instances, an SSL connection may be used to load the SNF code 114 onto the optimized network component.

Once the SNFs are deployed, the network controller 118 may monitor the SNFs to ensure they are performing well. This may include gaining telemetry data from the SNFs and/or hosts, and the telemetry data may allow the network controller 118 to ensure the SNFs are running within operational parameters. The DSL which generates the functions could also put in some boilerplate could around this telemetry, thus allowing it to be easily consumed by the network controller 118, and closing the loop around monitoring the SNF when running in production.

In some examples, the SNFs may be auto-scaled. For instance, the DSL can place some auto-scaling bits inside the generated code, and the network controller 118 can use that to handle auto-scaling in concert with the deployment option. This means that when an SNF hits certain thresholds around things such as bandwidth, CPU usage, etc., it could automatically scale. This would be done by using the telemetry data from the monitoring situation above. Autoscaling of SNFs can be performed in this way.

Figure 10:
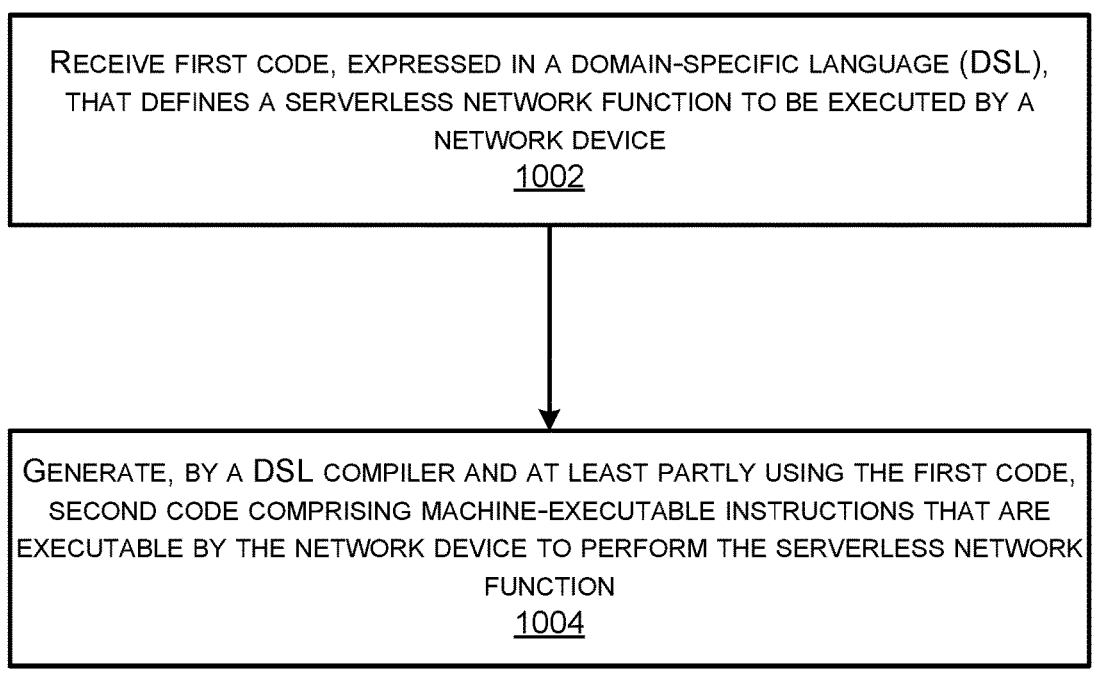
FIG. 10 illustrates a flow diagram of an example method for expressing a serverless network function using a domain-specific language, and generating code for executing the serverless network function.
Figure 11:
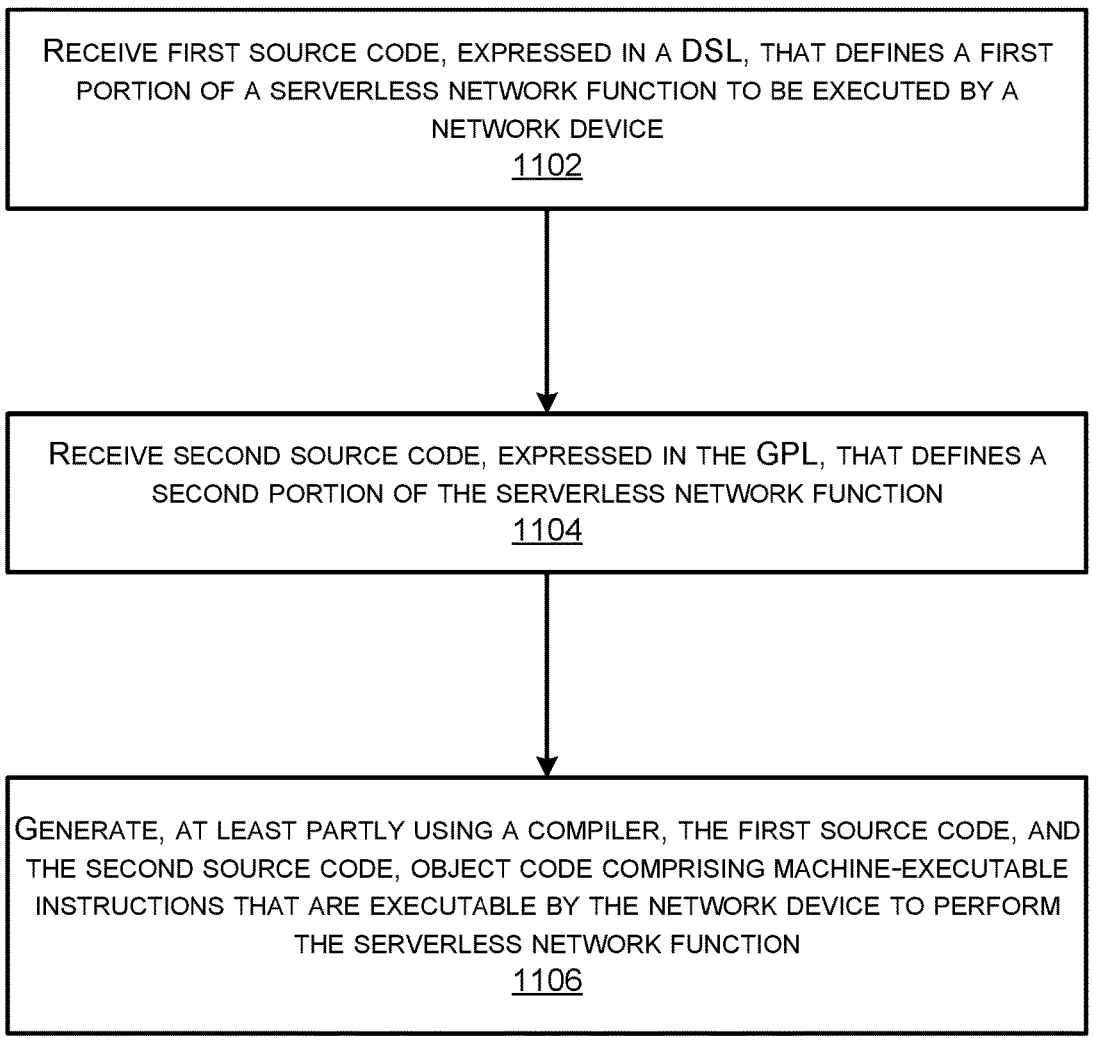
FIG. 11 illustrates a flow diagram of an example method for expressing a serverless network function using a domain-specific language and a general-purpose language, and generating code for executing the serverless network function.
Figure 12:
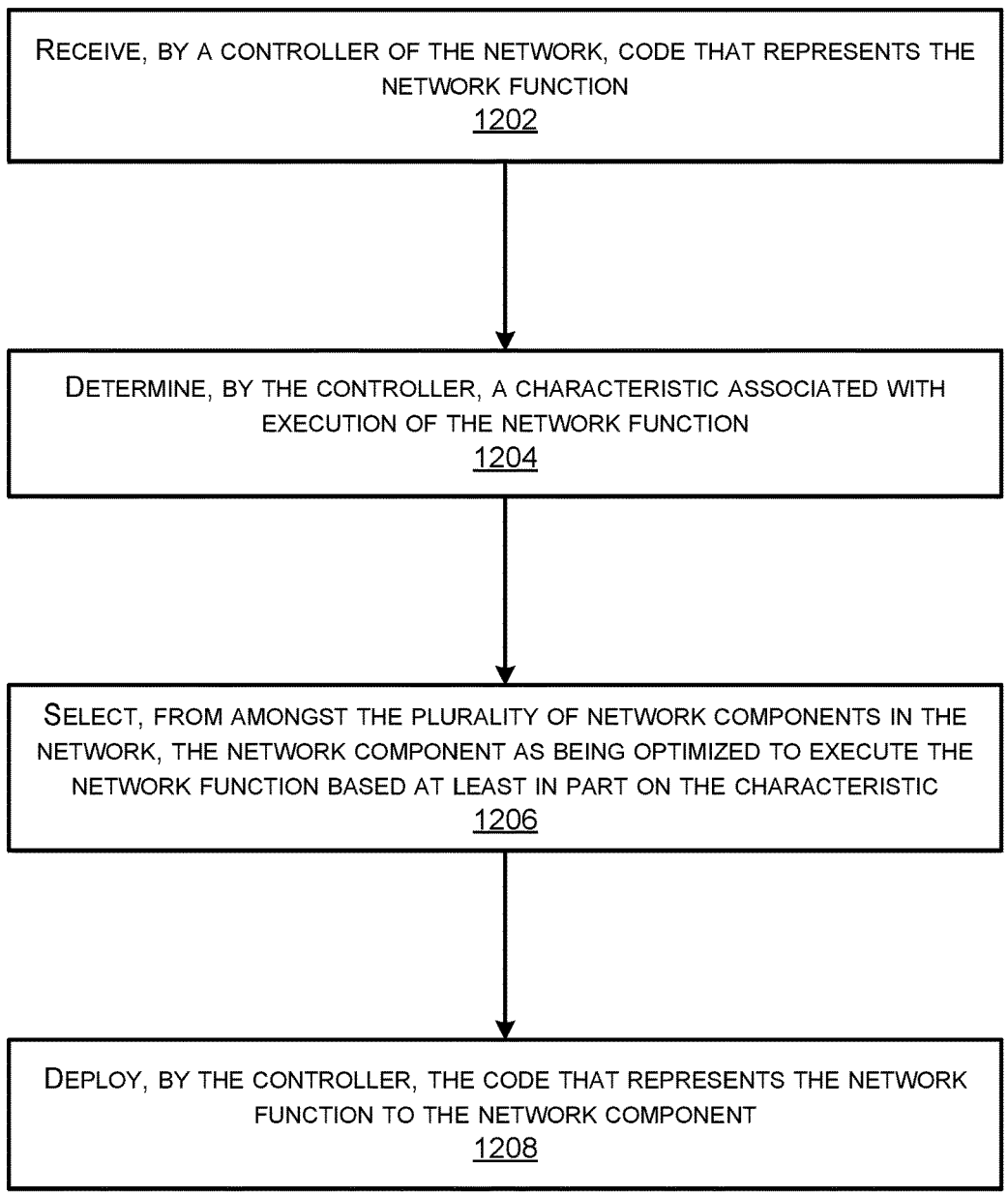
FIG. 12 illustrates a flow diagram of an example method for deploying a serverless network function to a network component at which the serverless network function is optimized to execute.

FIGS. 10-12 illustrate flow diagrams of example methods 1000, 1100, and 1200 that illustrate aspects of the functions performed at least partly by the devices described in FIGS. 10-12, such as the user device 106, the network controller 118, and so forth. The logical operations described herein with respect to FIGS. 10-12 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 10-12 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

In some instances, the steps of methods 1000, 1100, and/or 1200 may be performed by a device and/or a system of devices that includes one or more processors and one or more non-transitory computer-readable media storing computer-executable instructions that, when executed by the one or more processors, cause the one or more processors to perform operations of methods 1000, 1100, and/or 1200.

FIG. 10 illustrates a flow diagram of an example method 1000 for expressing a serverless network function using a domain-specific language, and generating code for executing the serverless network function.

At 1002, a user device 106 (and/or network controller 118), may receive first code, expressed in the DSL, that defines the serverless network function to be executed by a network device. Generally, the DSL is usable to define a plurality of serverless network functions and is specialized for defining SNFs. The serverless network function may comprise at least one of a packet acquisition function configured to selectively execute on the network device to acquire packets, a packet generation function configured to selectively execute on the network device to generate packets, a packet duplication function configured to selectively execute on the network device to duplicate packets, a packet modification function configured to selectively execute on the network device to modify packets, a packet drop function configured to selectively execute on the network device to drop packets, or a packet forwarding function configured to selectively execute on the network device to forward packets.

In some instances, the method 1000 may additionally include exposing a text editor configured to receive textual input expressed in the DSL to define serverless network functions, and wherein receiving the first code includes receiving the textual input that defines the serverless network function. Further, the method 1000 may additionally, or alternatively, include exposing an editor configured to receive graphical icon input usable to express serverless network functions in the DSL, wherein receiving the first code includes receiving one or more graphical icons via the editor that define the serverless network function.

At 1004, the user device 106 (and/or network controller 118) may generate, by a DSL compiler and at least partly using the first code, second code comprising machine-executable instructions that are executable by the network device to perform the serverless network function. In some instances, the method 1000 may additionally include receiving an indication of a device type of the network device on which the serverless network function is to execute, and determining, based at least in part on the device type, a programming language that is executable on the network device, where the second code is generated in the programming language.

In some instances, the method 1000 may further include providing the second code to a software-defined networking (SDN) controller that manages a network that includes the network device, and providing, by the SDN controller, the second code to the network device.

FIG. 11 illustrates a flow diagram of an example method 1100 for expressing a serverless network function using a domain-specific language and a general-purpose language, and generating code for executing the serverless network function.

At 1102, a user device 106 may receive first source code, expressed in the DSL, that defines a first portion of the serverless network function to be executed by a network device, the DSL being usable to define a plurality of serverless network functions. At 1104, the user device 106 may receive second source code, expressed in the GPL, that defines a second portion of the serverless network function. At 1106, the user device 106 may generate, at least partly using a compiler, the first source code, and the second source code, object code comprising machine-executable instructions that are executable by the network device to perform the serverless network function.

FIG. 12 illustrates a flow diagram of an example method 1200 for deploying a serverless network function to a network component at which the serverless network function is optimized to execute.

At 1202, a controller of a network may receive code that represents the network function. At 1204, the controller may determine a characteristic associated with execution of the network function. At 1206, the controller may select, from amongst the plurality of network components in the network, the network component as being optimized to execute the network function based at least in part on the characteristic. At 1210, the controller may deploy the code that represents the network function to the network component.

Figure 13:
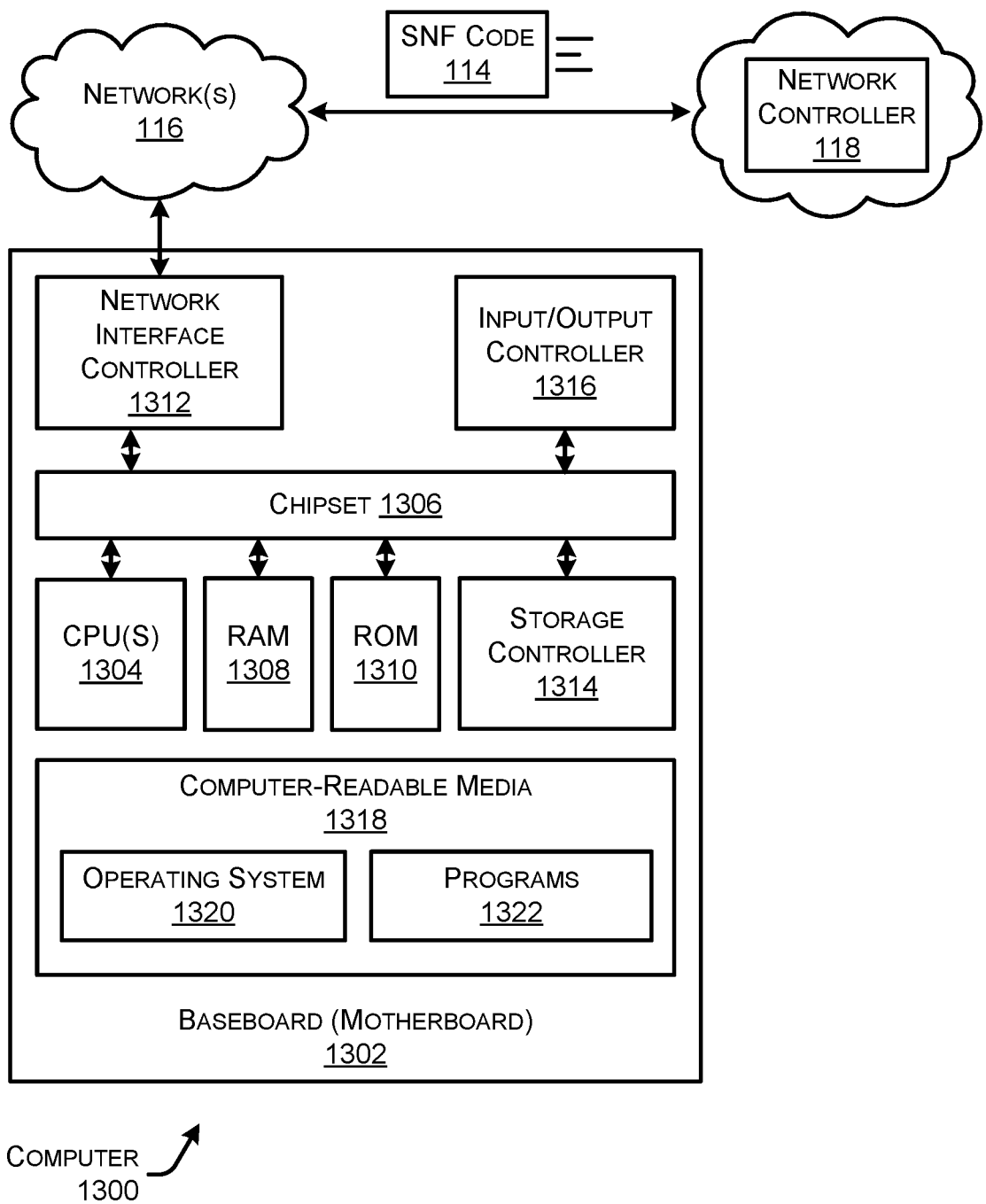
FIG. 13 is a computer architecture diagram showing an example computer architecture for a device capable of executing program components that can be utilized to implement aspects of the various technologies presented herein.

FIG. 13 shows an example computer architecture for a device capable of executing program components for implementing the functionality described above. The computer architecture shown in FIG. 13 illustrates any type of computer 1300, such as a conventional server computer, workstation, desktop computer, laptop, tablet, network appliance, e-reader, smartphone, or other computing device, and can be utilized to execute any of the software components presented herein. The computer 1300 may, in some examples, correspond to a user device 106, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 1300 includes a baseboard 1302, or "motherboard," which is a printed circuit board to which a multitude of components or devices can be connected by way of a system bus or other electrical communication paths. In one illustrative configuration, one or more central processing units ("CPUs") 1304 operate in conjunction with a chipset 1306. The CPUs 1304 can be standard programmable processors that perform arithmetic and logical operations necessary for the operation of the computer 1300.

The CPUs 1304 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1306 provides an interface between the CPUs 1304 and the remainder of the components and devices on the baseboard 1302. The chipset 1306 can provide an interface to a RAM 1308, used as the main memory in the computer 1300. The chipset 1306 can further provide an interface to a computer-readable storage medium such as a read-only memory ("ROM") 1310 or non-volatile RAM ("NVRAM") for storing basic routines that help to startup the computer 1300 and to transfer information between the various components and devices. The ROM 1310 or NVRAM can also store other software components necessary for the operation of the computer 1300 in accordance with the configurations described herein.

The computer 1300 can operate in a networked environment using logical connections to remote computing devices and computer systems through a network, such as the network 116. The chipset 1306 can include functionality for providing network connectivity through a NIC 1312, such as a gigabit Ethernet adapter. The NIC 1312 is capable of connecting the computer 1300 to other computing devices over the network 116. It should be appreciated that multiple NICs 1312 can be present in the computer 1300, connecting the computer to other types of networks and remote computer systems.

The computer 1300 can be connected to a storage device 1318 that provides non-volatile storage for the computer. The storage device 1318 can store an operating system 1320, programs 1322, and data, which have been described in greater detail herein. The storage device 1318 can be connected to the computer 1300 through a storage controller 1314 connected to the chipset 1306. The storage device 1318 can consist of one or more physical storage units. The storage controller 1314 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1300 can store data on the storage device 1318 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1318 is characterized as primary or secondary storage, and the like.

For example, the computer 1300 can store information to the storage device 1318 by issuing instructions through the storage controller 1314 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1300 can further read information from the storage device 1318 by detecting the physical states or characteristics of one or more particular locations within the physical storage units.

In addition to the mass storage device 1318 described above, the computer 1300 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1300. In some examples, the operations performed by the user device 106, the network controller 118, and or any components included therein, may be supported by one or more devices similar to computer 1300. Stated otherwise, some or all of the operations performed by user device 106 and/or network controller 118, and or any components included therein, may be performed by one or more computer devices 1300.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1318 can store an operating system 1320 utilized to control the operation of the computer 1300. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 1318 can store other system or application programs and data utilized by the computer 1300.

In one embodiment, the storage device 1318 or other computer-readable storage media is encoded with computer-executable instructions which, when loaded into the computer 1300, transform the computer from a general-purpose computing system into a special-purpose computer capable of implementing the embodiments described herein. These computer-executable instructions transform the computer 1300 by specifying how the CPUs 1304 transition between states, as described above. According to one embodiment, the computer 1300 has access to computer-readable storage media storing computer-executable instructions which, when executed by the computer 1300, perform the various processes described above with regard to FIGS. 1-12. The computer 1300 can also include computer-readable storage media having instructions stored thereupon for performing any of the other computer-implemented operations described herein.

The computer 1300 can also include one or more input/output controllers 1316 for receiving and processing input from a number of input devices, such as a keyboard, a mouse, a touchpad, a touch screen, an electronic stylus, or other type of input device. Similarly, an input/output controller 1316 can provide output to a display, such as a computer monitor, a flat-panel display, a digital projector, a printer, or other type of output device. It will be appreciated that the computer 1300 might not include all of the components shown in FIGS. 2 and/or 3, can include other components that are not explicitly shown in FIG. 13, or might utilize an architecture completely different than that shown in FIG. 13.

As described herein, the computer 1300 may comprise one or more of a user device 106, a network controller 118, and/or any other device. The computer 1300 may include one or more hardware processors 1304 (processors) configured to execute one or more stored instructions. The processor(s) 1304 may comprise one or more cores. Further, the computer 1300 may include one or more network interfaces configured to provide communications between the computer 1300 and other devices, such as the communications described herein as being performed by the user device 106 or network controller 118. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 1322 may comprise any type of programs or processes to perform the techniques described in this disclosure for generating SNFs using a DSL and/or deploying SNFs to optimized network components.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for identifying a network device from a plurality of network devices in a network on which to deploy a virtual network function (VNF), the method comprising:

receiving, by a controller of the network, code that represents the VNF, wherein the code that represents the VNF comprises object code generated at least partly using a domain-specific language that is usable to define serverless VNFs;

identifying, by the controller, at least one characteristic associated with execution of the VNF and a type associated with the VNF, wherein:
  the at least one characteristic comprises a particular type associated with the code that represents the VNF or a particular trust level associated with execution of the VNF; and
  the type associated with the VNF indicates an action performed by the VNF;

determining, by the controller, based at least in part on the at least one characteristic and the type, that the VNF is optimized to execute on a particular hardware type;

selecting, by the controller, from amongst the plurality of network devices in the network and based at least in part on placement data, the network device as being optimized to execute the VNF based at least in part on the network device having hardware of the particular hardware type; and deploying, by the controller, the code that represents the VNF to the network device.

2. The method of claim 1, wherein determining that the VNF is optimized to execute on the particular hardware type includes:
  determining that the code is of a particular type that is optimized to execute on one of a Field Programmable Gate Array (FPGA) or an Application-Specific Integrated Circuit (ASIC).

3. The method of claim 1, wherein:
  identifying the at least one characteristic associated with execution of the VNF includes determining an amount of a computing resource consumed by execution of the VNF; and
  selecting the network device includes determining that the network device has an availability of the computing resource to support the amount of the computing resource consumed by execution of the VNF.

4. The method of claim 1, wherein:
  the at least one characteristic associated with execution of the VNF comprises the particular type associated with the code that represents the VNF; and
  selecting the network device includes determining that the network device is configured to execute the particular type of the code.

5. The method of claim 1, wherein:
  the at least one characteristic associated with execution of the VNF comprises the particular trust level associated with execution of the VNF; and
  selecting the network device includes determining that the network device includes the hardware of the particular hardware type that is configured to execute network functions with the particular trust level.

6. A system that supports a controller of a network that identifies a network device from a plurality of network devices on which to deploy a virtual network function (VNF), the system comprising:
  one or more processors; and
  one or more non-transitory computer-readable media storing computer-executable instructions that cause the one or more processors to perform operations of:
    receiving, by the controller, code that represents the VNF, wherein the code that represents the VNF comprises object code generated at least partly using a domain-specific language that is usable to define serverless VNFs;
    identifying, by the controller, a characteristic associated with execution of the VNF and a type associated with the VNF, wherein:
      the characteristic includes a particular type associated with the code that represents the VNF or a particular trust level associated with execution of the VNF; and
      the type associated with the VNF indicates an action performed by the VNF;
    determining, by the controller, based at least in part on the characteristic and the type, that the VNF is optimized to execute on a particular hardware type;
    selecting, by the controller and from amongst the plurality of network devices in the network, the network device as being optimized to execute the VNF based at least in part on the network device having hardware of the particular hardware type; and
    deploying, by the controller, the code that represents the VNF to the network device.

7. The system of claim 6, wherein determining that the VNF is optimized to execute on the particular hardware type includes:
  determining that the code is of a particular type that is optimized to execute on one of a Field Programmable Gate Array (FPGA) or an Application-Specific Integrated Circuit (ASIC).

8. The system of claim 6, wherein:
  identifying the characteristic associated with execution of the VNF includes determining an amount of a computing resource consumed by execution of the VNF; and
  selecting the network device includes determining that the network device has an availability of the computing resource to support the amount of the computing resource consumed by execution of the VNF.

9. The system of claim 6, wherein:
  the characteristic associated with execution of the VNF comprises the particular type associated with the code that represents the VNF; and
  selecting the network device includes determining that the network device is configured to execute the particular type of the code.

10. The system of claim 6, wherein:
  the characteristic associated with execution of the VNF comprises the particular trust level associated with execution of the VNF; and
  selecting the network device includes determining that the network device includes the hardware of the particular hardware type that is configured to execute network functions with the particular trust level.

11. One or more non-transitory computer-readable media storing computer-executable instructions that, when executed by one or more processors, cause the one or more processors to preform operations comprising:
  receiving, by a controller of a network, code that represents a virtual network function (VNF), wherein the code that represents the VNF comprises object code generated at least partly using a domain-specific language that is usable to define serverless VNFs;
  identifying, by the controller, a characteristic associated with execution of the VNF and a type associated with the VNF, wherein:
    the characteristic includes a particular type associated with the code that represents the VNF or a particular trust level associated with execution of the VNF; and the type indicates an action performed by the VNF;

determining, by the controller, based at least in part on the characteristic and the type, that the VNF is optimized to execute on a particular hardware type;

identifying, by the controller, from amongst a plurality of network devices in the network, a first network device having first hardware of a first hardware type;

identifying, by the controller and from amongst the plurality of network devices in the network, a second network device having second hardware of a second hardware type;

determining, by the controller and based at least in part on placement data associated with the VNF, the first network device, and the second network device, that the first hardware type is more optimal than the second hardware type for executing the VNF; and deploying, by the controller, the code that represents the VNF to the first network device.

12. The one or more non-transitory computer-readable media of claim 11, wherein:

the first hardware type is one of a Field Programmable Gate Array (FPGA) or an Application-Specific Integrated Circuit (ASIC); and the second hardware type is a different one of the FPGA or the ASIC.

13. The one or more non-transitory computer-readable media of claim 11, wherein:

identifying the characteristic associated with execution of the VNF includes determining an amount of a computing resource consumed by execution of the VNF; and selecting the first network device includes determining that the first network device has an availability of the computing resource to support the amount of the computing resource consumed by execution of the VNF.

14. The one or more non-transitory computer-readable media of claim 11, wherein:

the characteristic associated with execution of the VNF comprises the particular type associated with the code that represents the VNF; and selecting the first network device includes determining that the first network device is configured to execute the particular type of the code.

15. The one or more non-transitory computer-readable media of claim 11, wherein:

the characteristic associated with execution of the VNF comprises the particular trust level associated with execution of the VNF; and selecting the first network device includes determining that the first hardware of the first hardware type that is configured to execute network functions with the particular trust level.

16. The method of claim 1, wherein determining that the VNF is optimized to execute on the particular hardware type includes:

determining that the code is of a particular type that is optimized to execute on a Vector Packet Processor (VPP) program.

17. The one or more non-transitory computer-readable media of claim 11, wherein determining that the first hardware type is more optimal than the second hardware type for executing the VNF is further based at least in part on state data associated with an architecture of the network, layout data associated with the architecture, and wherein the placement data comprises capacity data, management data, cost data, security concerns, application locality, SNF actions, DSL generated code, synergy data, or device type.

18. The method of claim 1, wherein the type associated with the VNF comprises one of a packet acquisition function configured to selectively execute on the network device to acquire packets, a packet generation function, a packet duplication function, a packet modification function, a packet drop function, or a packet forwarding function.

19. The method of claim 1, wherein the at least one characteristic of the VNF comprises one or more of a computing-resource capacity, management difficulty, cost for running the VNF on a particular network component, security concerns, application locality, or a type of target code of the code.

20. The method of claim 1, wherein the type associated with the VNF comprises a packet drop function, the method further comprising:

determining, by the controller and based on the type comprising the packet drop function, that the VNF is optimized to execute on the particular hardware type located at an edge of the network, wherein selecting the network device as being optimized to execute the VNF is based at least in part on the network device having hardware of the particular hardware type and being located at the edge of the network.

* * * * *